(12) United States Patent
Le Roux

(10) Patent No.: US 11,167,444 B2
(45) Date of Patent: Nov. 9, 2021

(54) SYSTEMS AND METHODS FOR THE CONSTRUCTION OF STRUCTURES

(71) Applicant: ICON TECHNOLOGY, INC., Austin, TX (US)

(72) Inventor: Alex Le Roux, Austin, TX (US)

(73) Assignee: Icon Technology, Inc., Austin, TX (US)

( * ) Notice: Subject to any disclaimer, the term of this patent is extended or adjusted under 35 U.S.C. 154(b) by 186 days.

(21) Appl. No.: 16/294,714

(22) Filed: Mar. 6, 2019

(65) Prior Publication Data

US 2020/0282593 A1    Sep. 10, 2020

(51) Int. Cl.
*B28B 1/00* (2006.01)
*E04G 21/04* (2006.01)
*B33Y 30/00* (2015.01)
*B33Y 10/00* (2015.01)

(52) U.S. Cl.
CPC .......... *B28B 1/001* (2013.01); *E04G 21/0436* (2013.01); *B33Y 10/00* (2014.12); *B33Y 30/00* (2014.12)

(58) Field of Classification Search
CPC ..... B28B 1/001; E04G 21/0436; B33Y 30/00; B33Y 10/00
See application file for complete search history.

(56) References Cited

U.S. PATENT DOCUMENTS

| | | | | |
|---|---|---|---|---|
| 10,851,538 B2 * | 12/2020 | Le Roux | ................ | B33Y 30/00 |
| 2017/0255202 A1 * | 9/2017 | Grivetti | ................ | G05D 1/0238 |
| 2018/0056544 A1 * | 3/2018 | Kreiger | ................ | B28B 1/001 |
| 2018/0086008 A1 * | 3/2018 | Northrup | ................ | B28C 7/163 |
| 2018/0181134 A1 * | 6/2018 | Muck | ................ | G05D 1/0094 |

* cited by examiner

*Primary Examiner* — Yung-Sheng M Tsui
(74) *Attorney, Agent, or Firm* — K&L Gates LLP

(57) ABSTRACT

Construction systems for constructing a structure on a foundation and methods relating thereto are disclosed. In an embodiment, the construction system includes a rail assembly configured to be mounted to the foundation. In addition, the construction system includes a gantry movably disposed on the rail assembly configured to translate along a first axis relative to the rail assembly. Further, the construction system includes a printing assembly movably disposed on the gantry and configured to translate along a second axis relative to the gantry. The second axis is orthogonal to the first axis. The printing assembly is configured to deposit vertically stacked layers of an extrudable building material on the foundation to construct the structure. The gantry has a width along the second axis that is configured to be adjusted relative to the foundation.

10 Claims, 29 Drawing Sheets

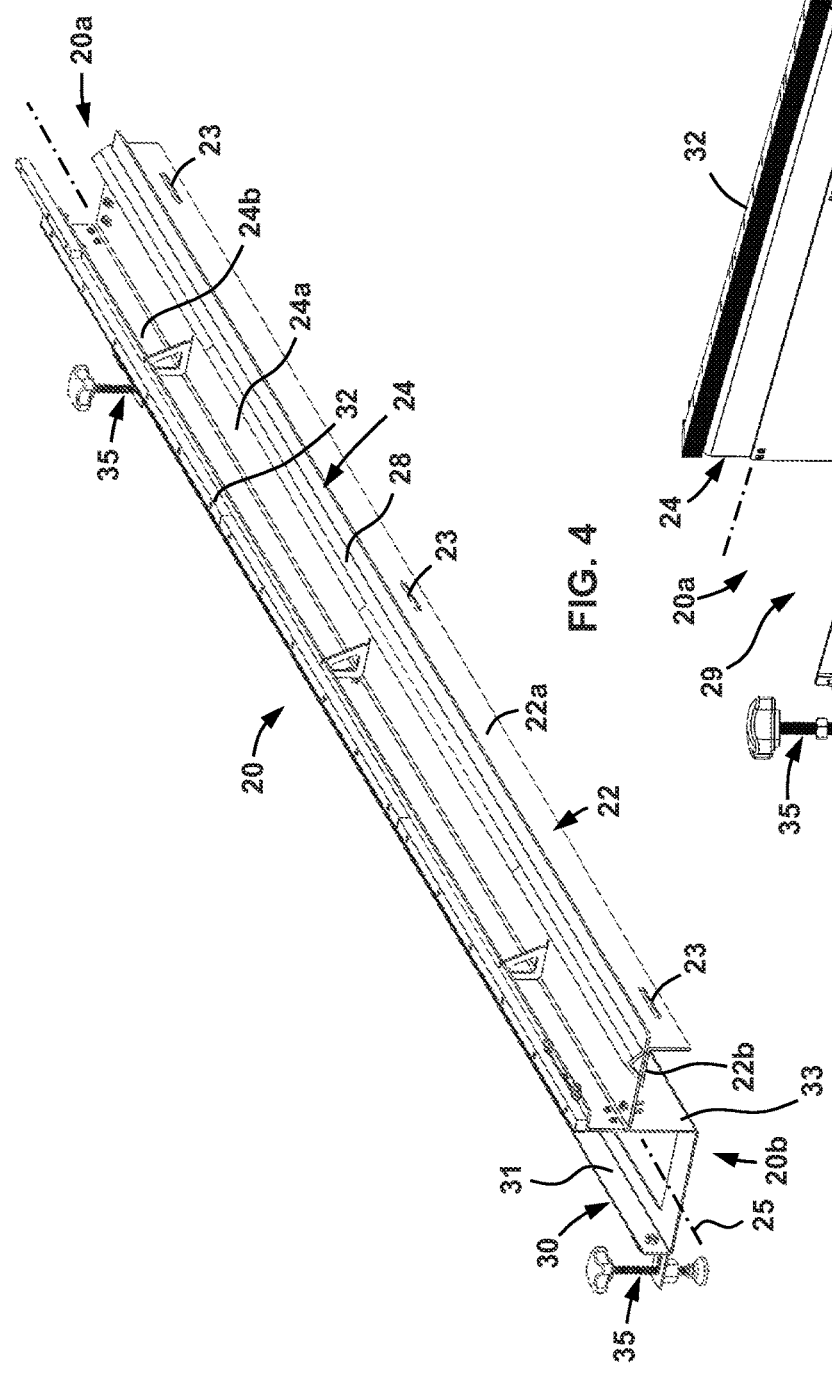
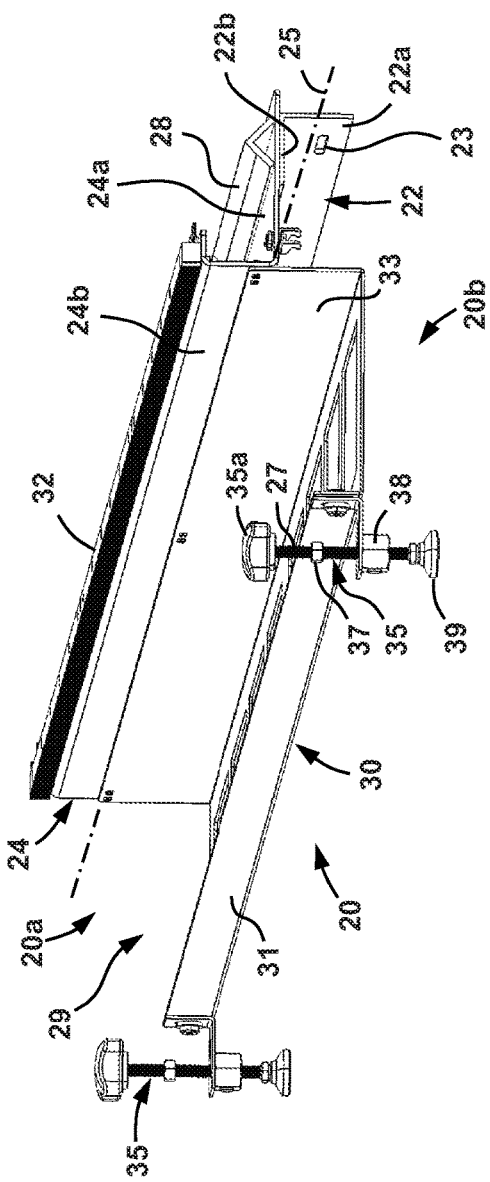
FIG. 4
FIG. 5

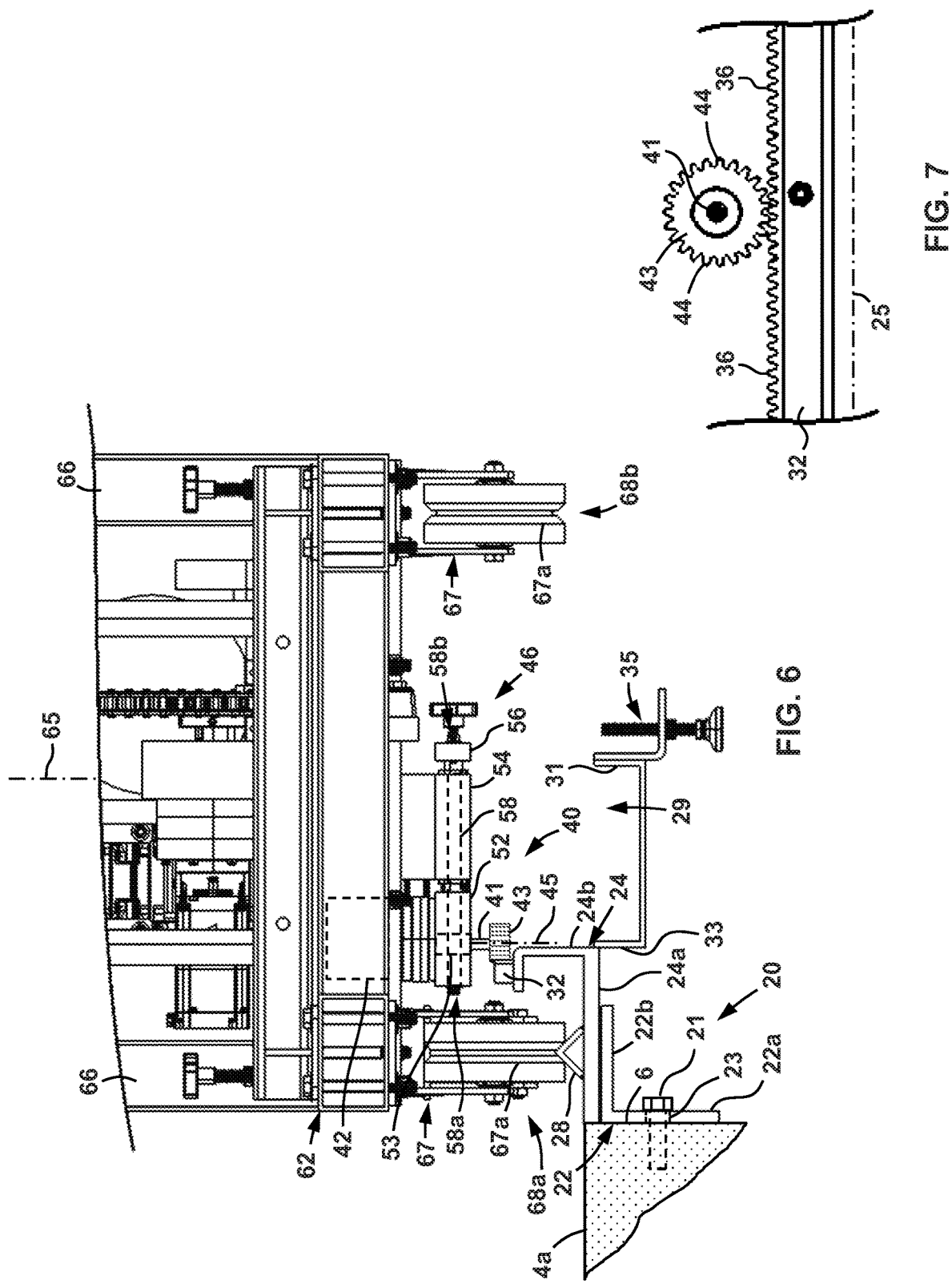

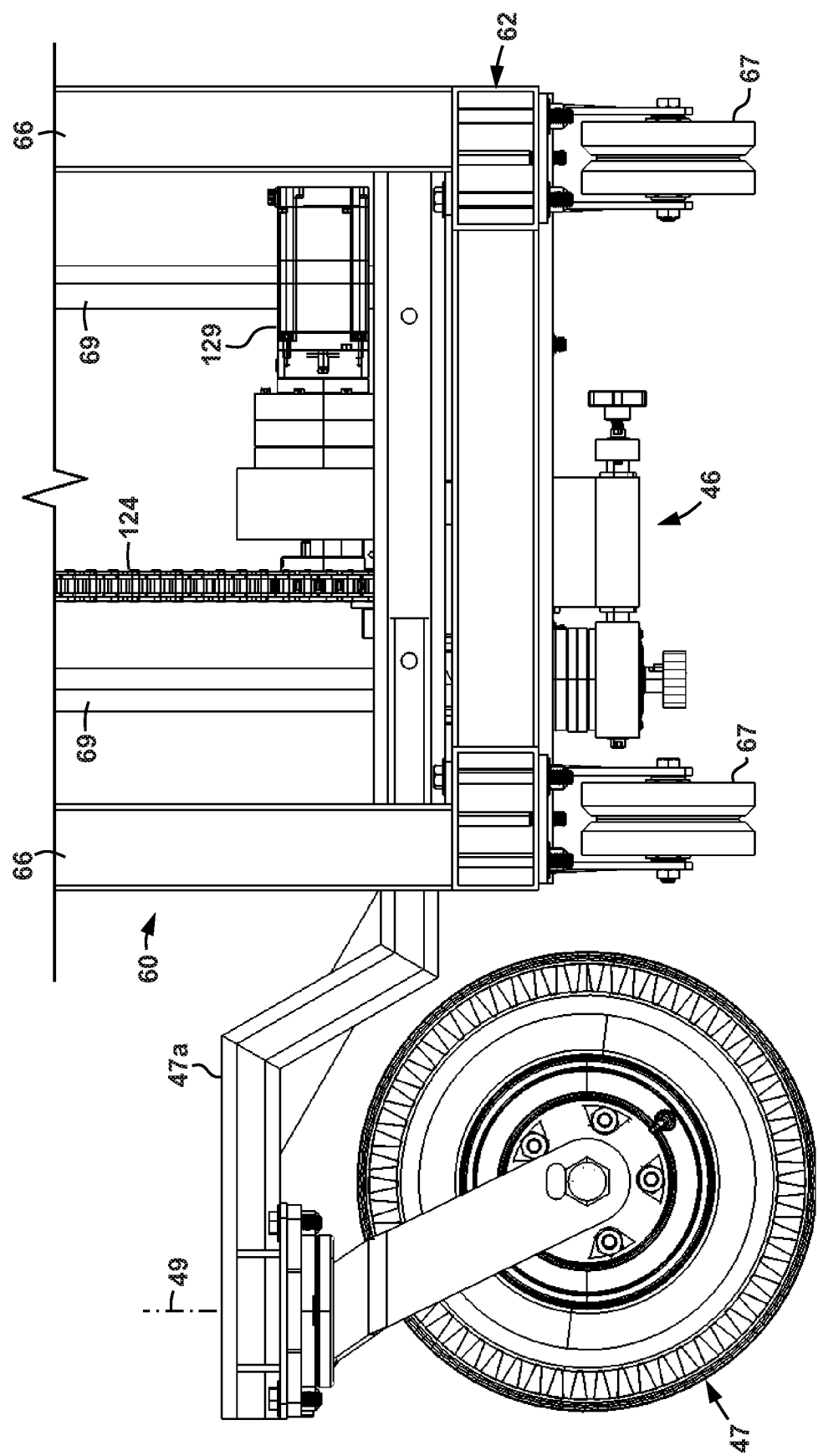

SYSTEMS AND METHODS FOR THE CONSTRUCTION OF STRUCTURES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure is generally directed to the construction of structures (e.g., dwellings, buildings, etc.). More particular, this disclosure is directed to the construction of structures utilizing additive manufacturing techniques.

Structures (e.g., dwellings, buildings, sheds, etc.) may be manufactured with a multitude of different materials and construction methods. Among the materials commonly used in the construction of structures is concrete. For example, concrete may be used to form the foundation as well as the exterior walls of a structure.

BRIEF SUMMARY

Some embodiments disclosed herein are directed to a construction system for constructing a structure on a foundation. In an embodiment, the construction system includes a rail assembly configured to be mounted to the foundation. In addition, the construction system includes a gantry movably disposed on the rail assembly configured to translate along a first axis relative to the rail assembly. Further, the construction system includes a printing assembly movably disposed on the gantry and configured to translate along a second axis relative to the gantry. The second axis is orthogonal to the first axis. The printing assembly is configured to deposit vertically stacked layers of an extrudable building material on the foundation to construct the structure. The gantry has a width along the second axis that is configured to be adjusted relative to the foundation.

Other embodiments disclosed herein are directed to a method of constructing a structure. In an embodiment, the method includes (a) adjusting a width of a gantry. The gantry includes a first vertical support assembly, a second vertical support assembly, a trolley bridge assembly coupled to and extending between the first and second vertical support assemblies, and a printing assembly movably coupled to the trolley bridge assembly. The width extends between the first and second vertical support assemblies. In addition, the method includes (b) engaging the first and second vertical support assemblies with a pair of rail assemblies mounted to opposing sides of a foundation, and (c) translating the first and second vertical support assemblies along a first axis relative to the pair of rail assemblies. Further, the method includes (d) translating the printing assembly along a second axis that is orthogonal to the first axis relative to the trolley bridge assembly. Still further, the method includes (e) extruding an extrudable building material from the printing assembly during (c) and (d).

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which:

FIGS. 4 and 5 are perspective views of one of the rail segments of the rail assemblies of the construction system of FIG. 1;

FIG. 6 is an enlarged front view of one of the vertical support assemblies of the gantry of FIG. 3 engaged with one of the rail assemblies of the construction system of FIG. 1;

FIG. 7 is an enlarged bottom view of a gear coupled to the vertical support assembly of FIG. 6 engaged with a rack mounted to the rail assembly of FIG. 6;

FIG. 8 is an enlarged front view of another vertical support assembly for use within the gantry of FIG. 3 according to some embodiments disclosed herein;

DETAILED DESCRIPTION

Figure 1:
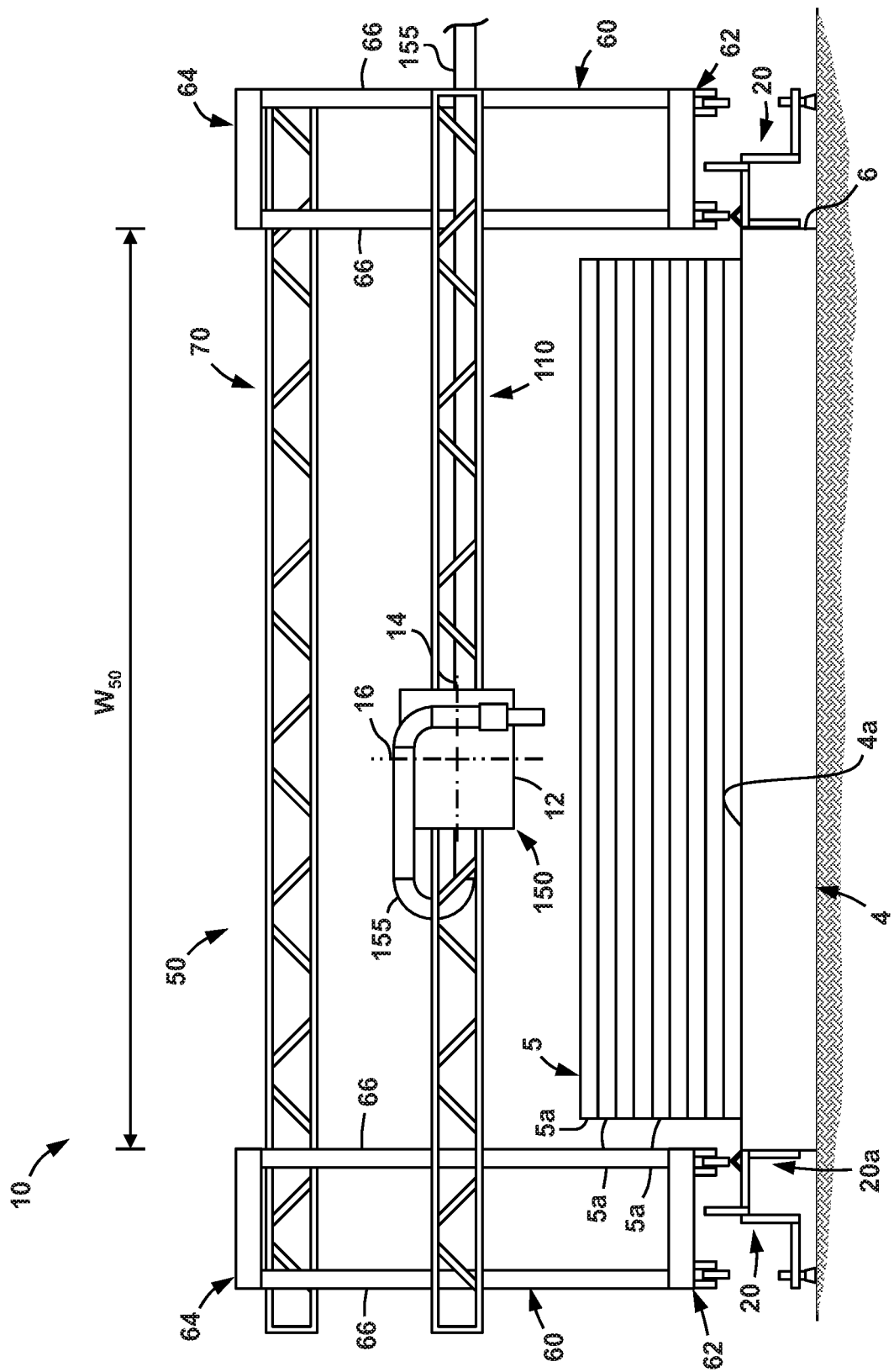
FIG. 1 is a front view of a construction system according to some embodiments disclosed herein.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As used herein, the terms "about," "approximately," "substantially," "generally," and the like mean plus or minus 10% of the stated value or range. In addition, as used herein, an "extrudable building material" refers to a building material that may be delivered or conveyed through a conduit (e.g., such as a flexible conduit) and extruded (e.g., via a nozzle or pipe) in a desired location. In some embodiments, an extrudable building material includes a cement mixture (e.g., concrete, cement, etc.). Further, as used herein, the term "computing device" refers to any suitable device (or collection of devices) that is configured to execute, store, and/or generate machine readable instructions (e.g., non-transitory machine readable medium). The term may specifically include devices, such as, computers (e.g., personal computers, laptop computers, tablet computers, smartphones, personal data assistants, etc.), servers, controllers, etc. A computing device may include a processor and a memory, wherein the processor is to execute machine readable instructions that are stored on the memory.

As previously described above, structures (e.g., dwellings, buildings, sheds, etc.) may be manufactured with a multitude of different materials and construction methods. Traditionally, a building (e.g., a dwelling) may be constructed upon a composite slab or foundation that comprises concrete reinforced with re-bar or other metallic materials. The structure itself may then be framed (e.g., with wood and/or metal framing members), and then an outer shell and interior coverings (e.g., ply-wood, sheet rock, etc.) may be constructed around the structural framing. Utilities (e.g., water and electrical power delivery as well as vents and ducting for air conditioning and heating systems) may be enclosed within the outer shell and interior covers along with insulation. This method of designing and constructing a structure is well known and has been successfully utilized in constructing an uncountable number of structures; however, it requires multiple constructions steps that may not typically be performed simultaneously and that often require different skills and trades to complete. As a result, this process for constructing a structure can extend over a considerable period (e.g., 6 months to a year or more). Such a lengthy construction period is not desirable in circumstances that call for the construction of a structure or multiple structures in a relatively short period of time.

Accordingly, embodiments disclosed herein include construction systems and methods of construction that allow a structure (such as a personal dwelling) to be constructed in a fraction of the time associated with traditional construction methods. In particular, embodiments disclosed herein utilize additive manufacturing techniques (e.g., three dimensional (3D) printing) in order to produce a structure more quickly and economically in a systematic manner.

Figure 2:
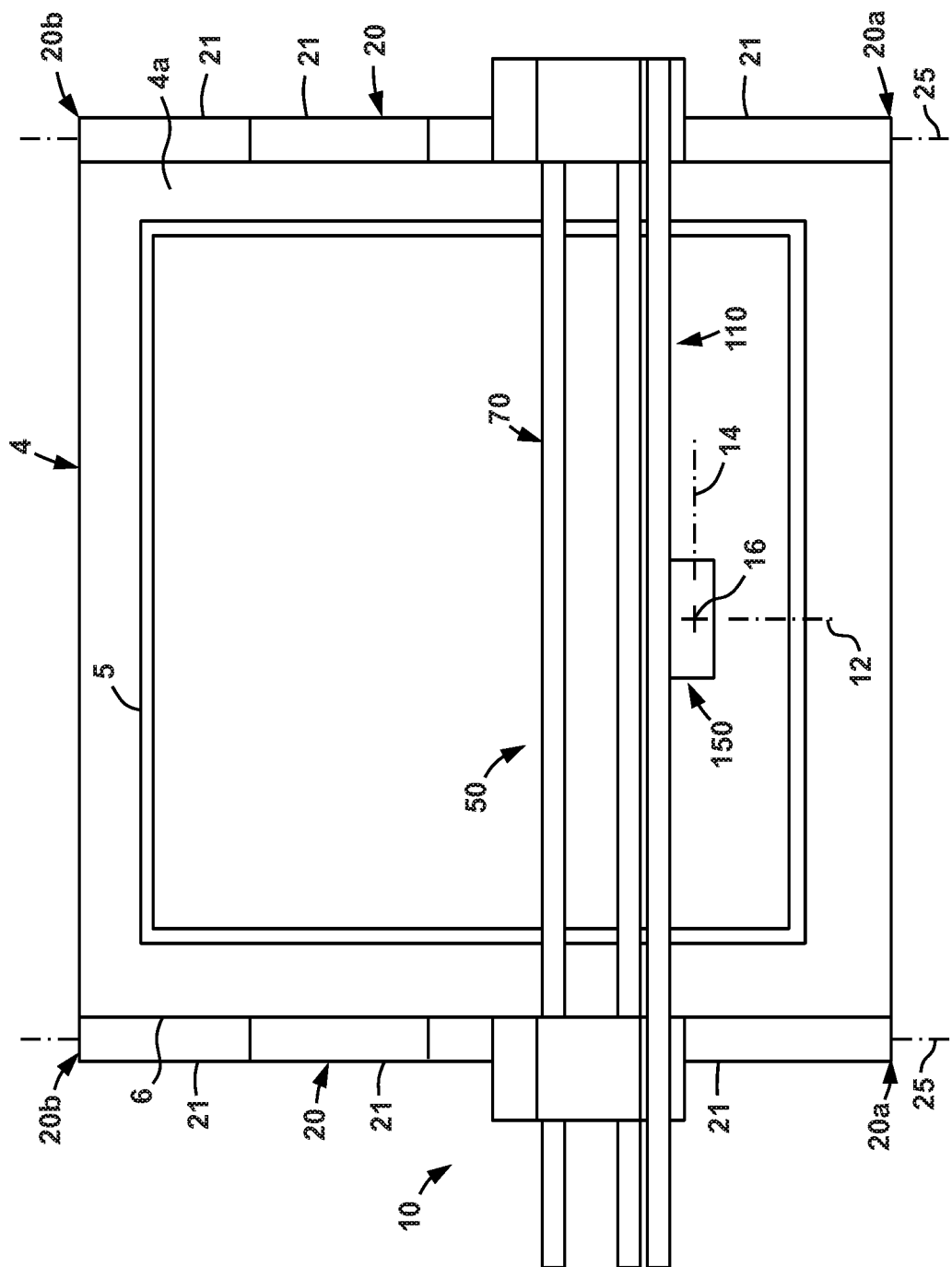
FIG. 2 is a schematic top view of the construction system of FIG. 1.

Referring now to FIGS. 1 and 2, a construction system 10 according to some embodiments is shown. In this embodiment, construction system 10 generally includes a pair of rail assemblies 20, a gantry 50 movably disposed on rail assemblies 20, and a printing assembly 150 movably disposed on gantry 50. As will be described below, construction system 10 is configured to form a structure 5 (such as for example a personal dwelling) via additive manufacturing, specifically 3D printing, on a foundation 4. In particular, construction system 10 (via rail assemblies 20 and gantry 50) is configured to controllably move or actuate printing assembly 150 relative to the foundation 4 along each of a plurality of orthogonal movement axes or directions 12, 14, 16 such that printing assembly 150 may controllably deposit an extrudable building material in a plurality of vertically stacked layers 5a to form structure 5. As shown in FIG. 2, axes 12, 14, 16 are each orthogonal to one another—with axis 12 being orthogonal to both axes 14, 16, axis 14 being orthogonal to axes 12 and 16, and axis 16 being orthogonal to axes 12 and 14.

Referring now to FIGS. 1, 2, 4, and 5, in this embodiment, each rail assembly 20 is disposed on a perimeter or side surface 6 of foundation 4 (see FIG. 1) and includes a central axis 25, a first end 20a, and a second end 20b opposite first end 20a. Axes 25 of rail assemblies 20 are parallel and radially spaced from one another such that first ends 20a and second ends 20b of rail assemblies 20 are generally aligned with one another across foundation 4. In addition, each of the axes 25 of rail assemblies 20 extends parallel to axis 12 (and thus, each axis 25 also extends in a direction that is perpendicular to the direction of axis 14 and the direction of axis 16).

As best shown in FIGS. 2 and 4-5, each rail assembly 20 includes a plurality of rail segments 21 coupled end-to-end along the corresponding axis 25. Each rail segment 21 includes a first end 21a and a second end 21b opposite first end 21a. Within each rail assembly 20, an end 21a, 21b of one of the corresponding rail segments 21 is coincident with the first end 20a and another end 21a, 21b of another of the corresponding rail segments 21 is coincident with the second end 20b. More particular, each rail segment 21 includes a first elongate angle member 22, a second elongate angle member 24, and an elongate cable tray 30, wherein each of the angles member 22, 24, and cable tray 30 extend axially between ends 21a, 21b along axis 25. First angle member 22 includes a first portion 22a and a second portion 22b extending perpendicularly from first portion 22a. First portion 22a includes a plurality of apertures 23 extending therethrough. In this embodiment, apertures 23 are slots that are elongated axially with respect to axis 25. As shown in FIG. 5, angle member 22 is secured to foundation 4 by inserting bolts 21 or other suitable connection members through the apertures 23 and into perimeter 6 of foundation 4. Accordingly, once the first elongate angle members 22 of rail assemblies 20 are secured to perimeter 6 of foundation 4, second portions 22b of angle members 22 extend parallel to and may be flush with top surface 4a of foundation 4.

Referring again to FIGS. 3 and 4, second elongate angle member 24 includes a first portion 24a, and a second portion 24b extending perpendicularly to the first portion 24a. First portion 24a extends parallel to second portion 22b of the corresponding first angle member 22 and is secured thereto via any suitable method (e.g., bolts, rivets, welding, etc.). An axially extending elongate angle member 28 is secured (e.g., welded, bolted, riveted, etc.) to first portion 24a of second angle member 24. As will be described in more detail below, angle members 28 of rail segments 21 align within each rail assembly 20 to form tracks to guide movement of gantry 50 (and printing assembly 150) across foundation 4 along axis 12 during construction operations. In addition, an elongate rack 32 is secured to second portion 24b of each second angle member 24. Accordingly, the rack 32 of rail segments 21 align with one another within each rail assembly 20 along the corresponding axis 25. Referring briefly to FIG. 7, each rack 32 includes a plurality of teeth 36 that are axially adjacent one another along the corresponding rail assembly 20.

Figure 3:
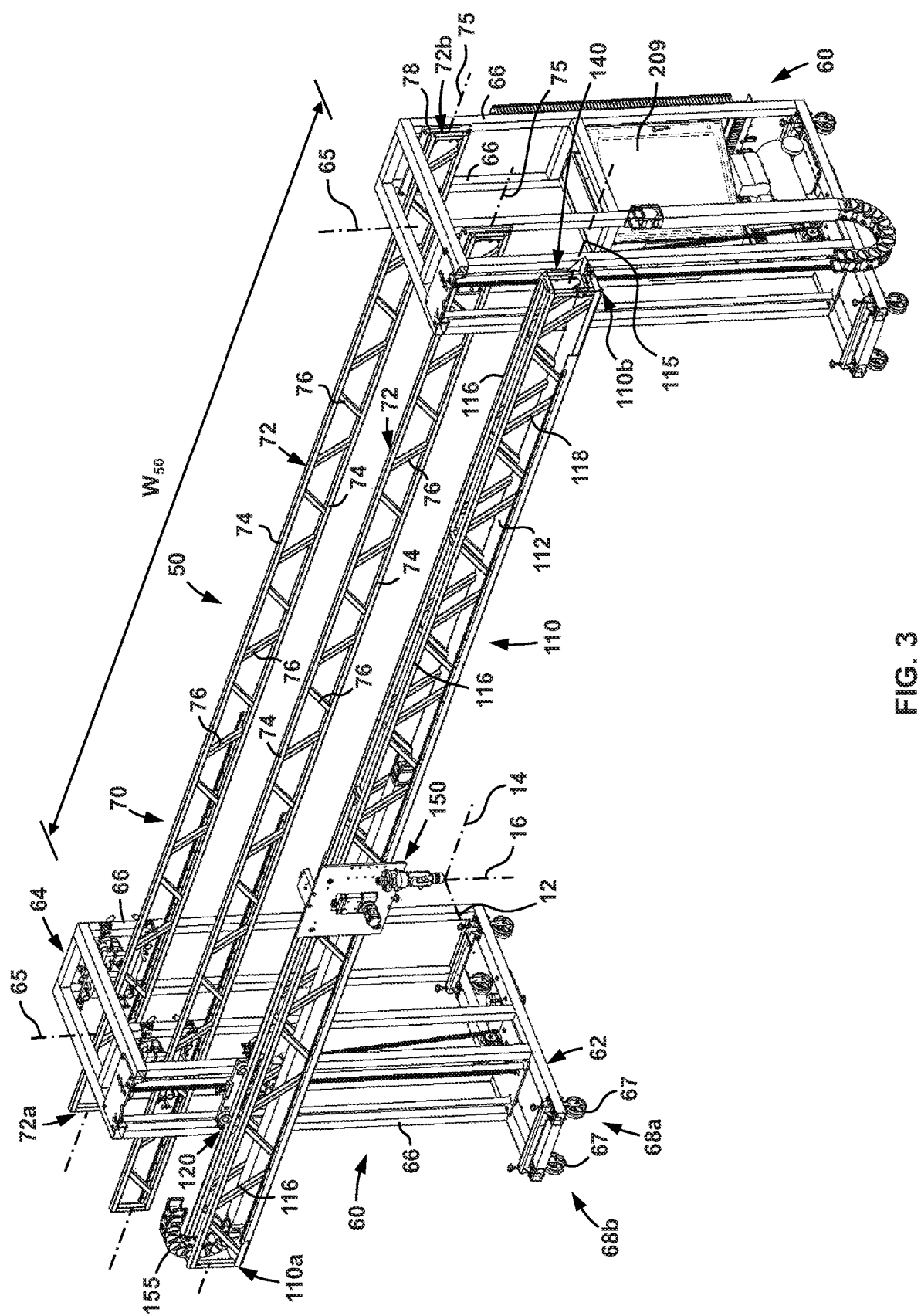
FIG. 3 is a perspective view of the gantry of the construction system of FIG. 1.

Referring still to FIGS. 3 and 4, cable tray 30 comprises an elongate channel member having a pair of axially extending laterally spaced walls 31, 33 that define a channel 29 therebetween. A plurality of foot assemblies 35 are coupled to wall 31 via a plurality of threaded collars 38. Each foot assembly 35 includes a handle 35a, a foot 39, and a threaded rod 27 extending therebetween. Threaded rod 27 is threadably engaged within collar 38 such that rotation of rod 27 via handle 35a adjusts a position of foot 39 in a generally vertical direction (e.g., in a direction that is parallel to axis 16—see FIGS. 1-3). A jam nut 37 is threadably engaged about threaded rod 27 between handle 35a and collar 38. Once a desired position (e.g., vertical position) of foot 39 is achieved per rotation of threaded rod 27 within collar 38 as previously described, jam nut 27 may be readily advanced along rod 27 until it bears against collar 38 (or the structure supporting collar 38), thereby placing threaded rod 27 in tension and effectively fixing the rotational and axial position of threaded rod 27 and foot 29 relative to collar 38.

Referring still to FIGS. 3 and 4, wall 33 of cable tray 30 is secured (e.g., bolted, welded, riveted, etc.) to second portion 24b of second angle member 24 so that channel 29 extends axially with respect to axis 25 in a position that is radially adjacent to second angle member 24. As will be described in more detail below, as gantry 50 traverses along foundation 4 along axis 12, cable tray 30 (particularly channel 29) align along the corresponding axes 25 to receive cables, hoses, pipes, etc. that are routed to and from gantry 50 and/or printing assembly 150 from adjacent devices, sources, equipment, etc., such that the risk of impingement of one of the cables, hoses, pipes, etc. with gantry 50 during operations is reduced.

Referring again to FIGS. 1-3, gantry 50 generally includes a pair of vertical support assemblies 60, an upper bridge assembly 70 spanning between vertical support assemblies 60, and a trolley bridge assembly 110 also spanning between vertical support assemblies 60. As will be described in more detail below, each of the vertical support assemblies 60 is movably coupled to a corresponding one of the rail assemblies 20 so that vertical support assemblies 60 may traverse along axis 12 during operations. In addition, trolley bridge assembly 110 is movably coupled to each of the vertical support assemblies 60 so that trolley bridge assembly 110 may traverse along axis 16 during operations. Each of these components will now be described in more detail below.

Referring specifically to FIG. 3, each vertical support assembly 60 includes a longitudinal axis 65, a first or lower support frame 62, and a second or upper support frame 64 axially spaced from lower support frame 62 along axis 65. In addition, vertical support assembly 60 includes a plurality of support legs 66 extending axially between frames 62, 64 with respect to axis 65. In this embodiment, axis 65 extends in the vertical direction, or along the direction of the force of gravity, and thus, axis 65 of each vertical support assembly 60 is parallel to axis 16, and support legs 66 of each vertical support assembly 60 extend vertically between the corresponding girders 62, 64. Further, each vertical support assembly 60 includes a pair of guide rods 69 extending axially between frames 62, 64. As will be described in more detail below, guide rods 69 guide trolley bridge assembly 110 as it traverses along axis 16 relative to vertical support assembles 60 during operations.

Referring now to FIGS. 3 and 6, each vertical support assembly 60 further includes a plurality of rollers 67 coupled to lower support frame 62. One or more of the rollers 67 is configured to engage with the aligned angle member 28 within the corresponding rail assembly 20 during operations to facilitate the movement of gantry 50 along axis 12. In particular, in this embodiment, lower support frame 62 within each vertical support assembly 60 includes a total of four rollers 67 disposed in a pair of rows 68a, 68b—namely a first or inner row 68a, and a second or outer row 68b. Rows 68a, 68b are spaced from one another in a radial direction with respect to axis 65 (and thus axially with respect to axis 14). In addition, within each vertical support assembly 60, the inner rows 68a of roller 67 are more proximate the perimeter 6 of foundation than outer rows 68b of rollers 67 with respect to the radial direction of axis 65, when gantry is disposed on rail assemblies 20 in the manner shown in FIGS. 1 and 2.

Referring now to FIG. 6, in this embodiment, rollers 67 of inner rows 68a engage with rails 28 on rail assemblies 20; however, in other embodiments, the rollers 67 of outer rows 68b may engage with rails 28. In still other embodiments, the inner row 68a of rollers 67 of one of the vertical support assemblies 60 may engage with a corresponding one of the rails 28 while the outer row 68b of the other of the vertical support assemblies 60 may engage with the other of the rails 28. Further, in other embodiments, each (or at least one of) the vertical support assemblies 60 may include only the inner row 68a or only the outer row 68b of rollers 67.

Referring still to FIG. 6, each roller 67 includes a circumferential channel 67a, which in this embodiment is a v-shaped channel or groove extending circumferentially about roller 67. Channel 67a engages and mates with elongate angle member 28 of a corresponding one of the rail assemblies 20. Thus, during operations, each vertical support assembly 60 (and thus also gantry 50—see FIGS. 1 and 2) is configured to traverse axially with respect to axes 25 of rail assemblies 20 and axis 12 along and relative to top surface 4a of foundation 4 via rolling engagement between rollers 67 and elongate angle members 28.

A lateral actuation assembly 40 is coupled between each vertical support assembly 60 and the corresponding rail assembly 20 (that is, there is a corresponding lateral actuation assembly 40 coupled between each vertical support assembly 60 and corresponding rail assembly 20 within construction system 10). However, it should be appreciated that in other embodiments, a single lateral actuation assembly 40 is coupled between a select one of the vertical support assemblies 60 and a corresponding one of the rail assemblies 20. Each lateral actuation assembly 40 generally comprises a driver 42 and a connection block assembly 46 for coupling driver 42 to lower support frame 62 of vertical support assembly 60.

Driver 42 includes an output shaft 41 and is configured to rotate shaft 41 about an axis 45 that extends in a direction that is generally perpendicular to the direction of axis 25 of the corresponding rail assembly 20 (however, it should be appreciated that such precise alignment may not exist in other embodiments). Driver 42 may comprise any suitable driver or prime mover for rotating output shaft 41 about axis 45, such as, for example, an electric motor, a hydraulic motor, a pneumatic motor, etc. In this embodiment, driver 42 comprises an electric motor (e.g., a servo motor). In addition, driver 42 is configured to rotate shaft 41 in either direction (e.g., clockwise, counterclockwise, etc.) about axis 45. As best shown in FIG. 7, shaft 41 is coupled to a gear 43 (e.g., a pinion gear) that includes a plurality of teeth 44 that are configured to mesh with the teeth 36 of racks 32 of the corresponding rail assembly 20.

Referring again to FIG. 6, driver 42 (including shaft 41 and gear 43) is mounted to lower support frame 62 via a connection block assembly 46 as previously described. Connection block assembly 46 includes a first block or member 52 mounted to driver 42, a second block or member 54 mounted to lower frame 62, and a third block or member 56. First block 52 includes an aperture 53 that receives shaft 41 of driver 42 therethrough along axis 45. A plurality of connector studs 58 (or more simply "studs 58") extend through each of the first block 52, second block 54, and third block 56. In this embodiment, connector studs 58 extend through blocks 52, 54, 56 in a direction that is perpendicular to the direction of axis 45 of shaft 41. Each stud 58 has a first end 58a, and a second end 58b opposite first end 58a. First block 52 is proximate first ends 58a of each stud 58, third block 56 is proximate second ends 58b of each stud 58, and second block 54 is disposed between blocks 52, 56.

In addition, studs 58 are fixed relative to first block 52 and third block 56 such that studs 58 may not move relative to blocks 52, 56 during operations. Any suitable technique may be used to fix studs 58 relative to blocks 52, 56, such as for example, engaging nuts to studs 58 on either side of blocks 52, 56, threadably engaging studs 58 within blocks 52, 56, welding studs 58 to blocks 52, 56, etc. In addition, in this embodiment, studs 58 may freely slide within and relative to second block 54. A biasing member (not shown) is disposed between first block 52 and second block 54. The biasing member (not shown) is configured to bias first block 52 away from second block 54 along studs 58. In this embodiment, the biasing member (not shown) may comprise a coiled spring; however, any suitable biasing member configured to linearly bias to blocks 52, 54 apart from one another may be used in other embodiments, such as, for example, a piston. Because studs 58 are fixed relative to first block 52 and third block 56, and are free to slide within second block 54 as previously described, biasing first block 52 from second block 54 along studs 58 also biases third block 56 toward second block 54 along studs 58. In addition, the biasing of first block 52 away from second block 54 further along studs 58 biases gear 43 into engagement with the racks 32 of the corresponding rail assembly 20. Accordingly, connection block assembly 46 is configured to bias teeth 44 of gear 43 into cooperative engagement with the corresponding teeth 36 on racks 32 during operations (see FIG. 7). It should be appreciated that in other embodiments, driver 42 is mounted to lower support frame 62 either directly or via any other suitable frame, bracket, coupling, etc. in place of connection block assembly 46.

Referring again to FIGS. 1, 6, and 7, during operations, driver 42 of each lateral actuation assembly 40 is selectively actuated rotate the corresponding shaft 41. Due to the engagement between teeth 44 of shafts 41 (see FIG. 7) and the teeth 36 of the corresponding racks 32 on rail assemblies 20, the rotation of shafts 41 about the corresponding axes 45 causes traversal of each vertical support assembly 60 axially along the corresponding rail assembly 20 with respect to axis 12. Accordingly, the actuation of drivers 42 causes movement or translation of gantry 50 along axis 12 relative to foundation 4.

Referring briefly to FIG. 8, in some embodiments, one (or each) of the vertical support assemblies 60 may include an additional wheel or wheels 47 mounted to lower support frame 62. As will be described in more detail below, the additional wheel(s) 47 may be utilized to maneuver gantry 50 either before, during, or after a construction operation. For instance, wheel(s) 47 may be used to engage with ramps during loading or unloading of gantry 50 on or from, respectively, a trailer or other suitable conveyance device. As shown in FIG. 8, in this embodiment, wheel 47 is mounted to lower support frame 62 via a laterally extending arm 47a. In addition, in this embodiment, wheel 47 includes a rotating caster 47b that is configured to allow wheel 47 to rotate about a generally vertically oriented axis 49 (e.g., that may be generally parallel to and radially offset from axis 16 previously described). The free rotation of wheel(s) 47 about the respective axes 49 (that is, in embodiments where multiple wheels 47 are mounted to gantry 50) may allow gantry 50 to be translated as well as rotated along a support surface (e.g., foundation 4, a warehouse floor, a trailer bed, etc.).

Referring again to FIG. 3, upper bridge assembly 70 comprises a pair of elongate trusses 72 coupled to and spanning between vertical support assemblies 60. In particular, each truss 72 includes a central axis 75 that extends parallel to but is axis 14, a first end 72a, and a second end 72b opposite first end 72a. In addition, each truss 72 comprises a pair of elongate chords or members 74 that extend axially between ends 72a, 72b and that are radially separated from one another about axis 75 and a plurality of webs or stiffening members 76 extending between chords 74. Second ends 72b are secured to one of the vertical support assemblies 60 via corresponding mounting plates 78 that are further mounted to corresponding ones of the support legs 66. However, trusses 72 are adjustably coupled to the other vertical support assembly 60 such that the spacing between vertical support assemblies 60 along trusses 72 (or along axes 75, 14) may be adjusted. Accordingly, gantry 50 has a width $W_{50}$ extending along axis 14 between vertical support assemblies 60 that is adjustable to accommodate different widths of foundation 4 (see FIGS. 1 and 2).

Referring now to FIGS. 9-14, first ends 72a of each truss 72 is coupled to one of the vertical support assemblies 60 via a corresponding lateral adjustment assembly 80. Generally speaking, each lateral adjustment assembly 80 includes a first plate 82, a second pate 84 spaced from first plate 82, and a plurality of rollers 86 coupled to first plate 82. First plate 82 is mounted to a pair of the support legs 66 and second plate 84 is coupled to first plate 82 such that second plate 84 is spaced from first plate 82 in a radial direction with respect to axes 65, 14.

Figure 14:
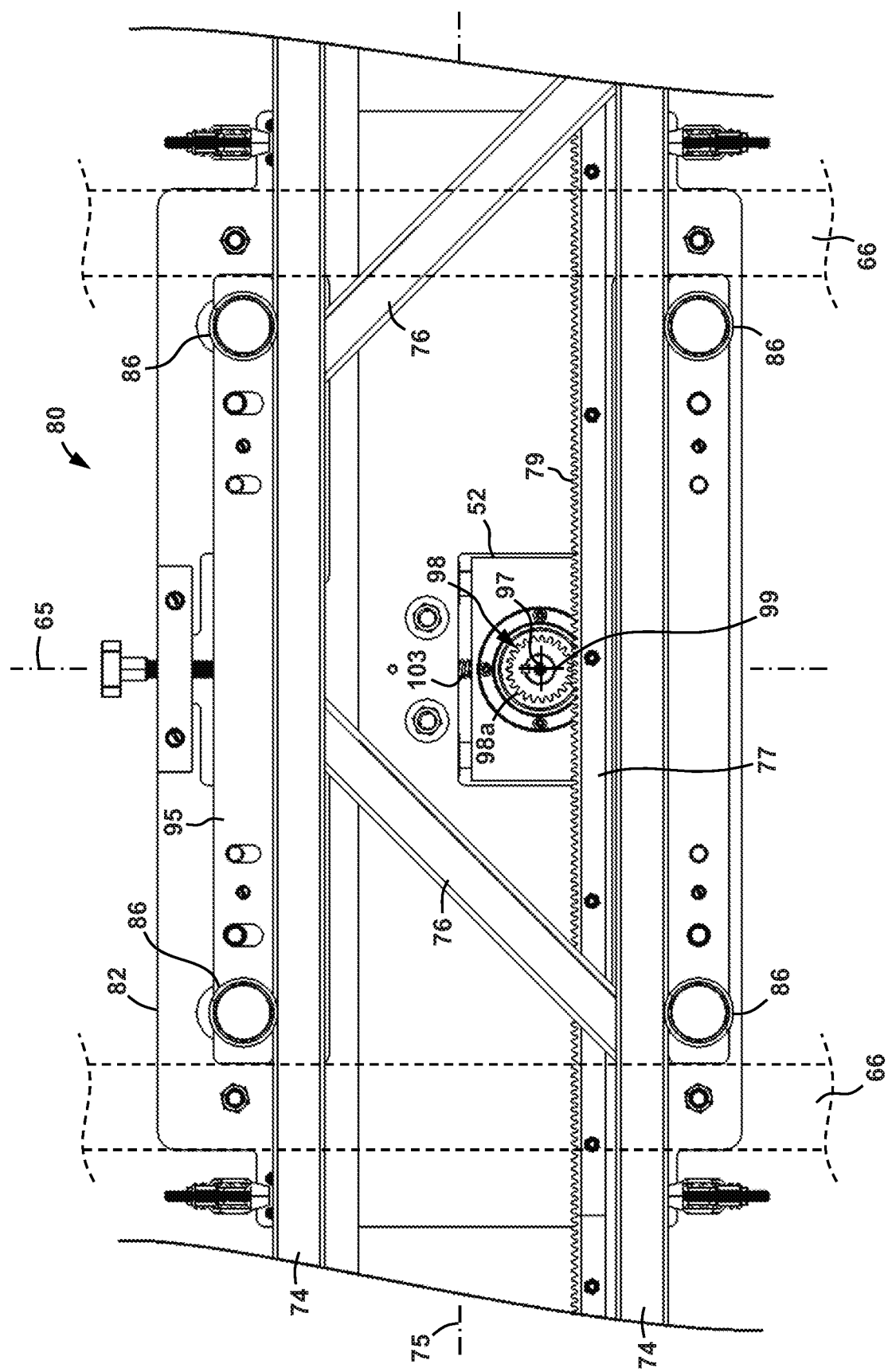
FIG. 14 is another front view of the lateral adjustment assembly of FIG. 9 with one of the plates removed.

Referring now to FIG. 14, a pair of mounting blocks 95, 97 are mounted to first plate 82 such that mounting blocks 95, 97 are disposed between plates 82, 84 during operations. In particular, the mounting blocks 95, 97 include a first or upper mounting block 95 and a second or lower mounting block 97 vertically spaced from upper mounting block 95 (e.g., blocks 95, 97 are spaced in a direction that is parallel to axes 65, 16). A first pair of the rollers 86 is rotatably mounted to upper mounting block 95, while a second pair of the rollers 86 is rotatably mounted to lower mounting block 97. A corresponding one of the trusses 72 is received between plates 82, 84 such that elongate chords 74 engage with rollers 86. In particular, the rollers 86 that are rotatably mounted upper mounting block 95 are engaged with a one of the elongate chords 74 of truss 72, and the rollers 86 that are rotatably mounted to lower mounting block 97 are engaged with another of the elongate chords 74 of truss 72. During operations, the vertical support assembly 60 mounted to lateral adjustment assemblies 80 may translate along trusses 72 (e.g., axially with respect to axes 14, 75) relative to the other vertical support assembly 60 via the rolling engagement between rollers 86 and elongate chords 74 of trusses 72. Thus, the lateral spacing (e.g., the spacing along axis 14) between vertical support assemblies 60 of gantry 50 (and thus the width $W_{50}$—see e.g., FIGS. 1 and 3) may be adjusted via the rolling engagement between trusses 72 and rollers 86 within lateral adjustment assemblies 80, so as to allow gantry 50 to span across foundations (e.g., foundation 4) having a wide variety of widths.

Referring again to FIGS. 9-14, each lateral adjustment assembly 80 also includes a plurality of locking assemblies 88 mounted to first plate 82 that are configured to selectively engage with elongate chords 74 so as to fix or lock the position of the corresponding vertical support assembly 60 along trusses 72 during operations. In particular, each locking assembly 88 includes a handle 85, an engagement member 87, and a frame 89 coupled between handle 85 and engagement member 87. As best shown in FIG. 12, frame 89 includes a first frame member 89a, a second frame member 89b, and a third frame member 89c. First frame member 89a is mounted to first plate 82, second frame member 89b is mounted to handle 85, and third frame member 89c is mounted to engagement member 87. In addition, second frame member 89b is pinned to each of the first frame member 89a and the third frame member 89c at a first pinned connection 81 and a second pinned connection 83, respectively. During operations, the manipulation or movement of handle 85 causes second frame member 89b to rotate relative to first frame member 89a about the first pinned connection 81 so that third frame member 89c and engagement member 87 are moved toward truss 72 (specifically toward a corresponding one of the elongate chords 74). The movement of third frame member 89c and engagement member 87 is further facilitated by the relative rotation of second frame member 89b and third frame member 89c about second pinned connection 83. Thus, during operations, when a desired position of trusses 72 and vertical support assemblies 60 (or a desired spacing of vertical support assemblies 60 along axis 14) is achieved, handles 85 of locking assembles 88 may be manipulated to cause engagement members 87 to engage with the trusses 72 of upper bridge assembly 70 so as to effectively lock the relative positions of vertical support assemblies 60 and trusses 72.

Figure 9:
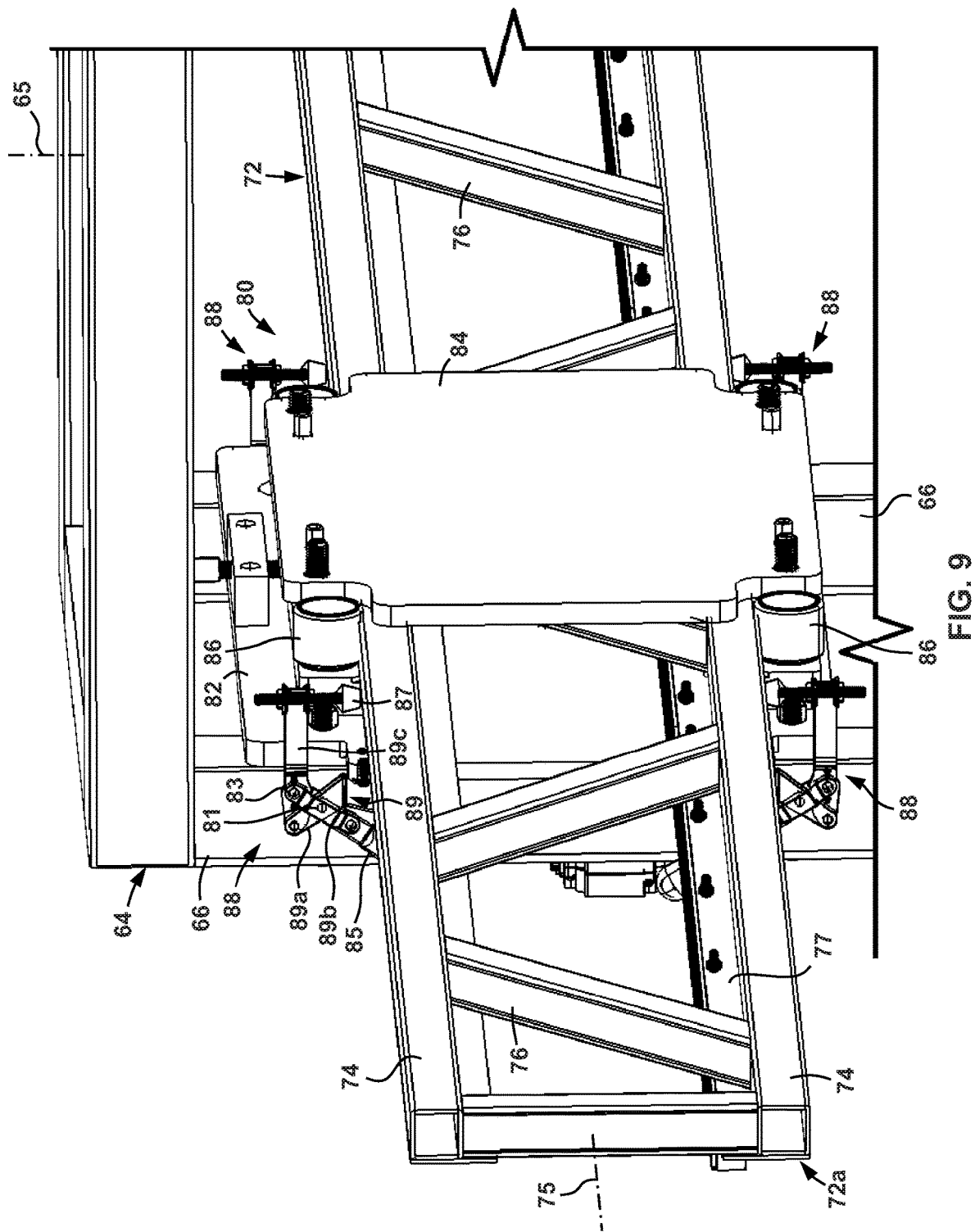
FIG. 9 is a perspective view of one of the lateral adjustment assemblies for an upper bridge assembly of the gantry of FIG. 3.
Figure 10:
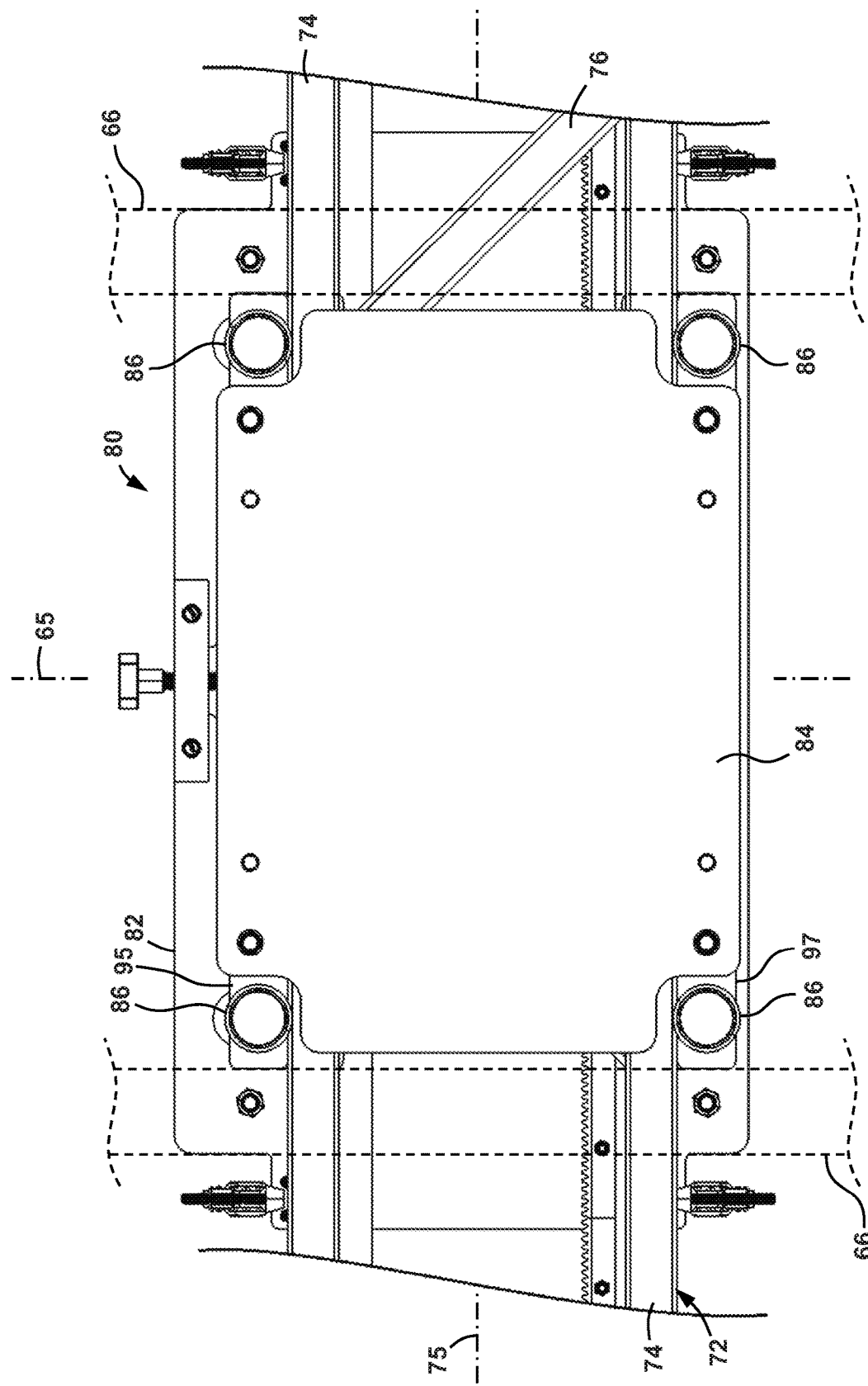
FIG. 10 is a front view of the lateral adjustment assembly of FIG. 9.
Figure 11:
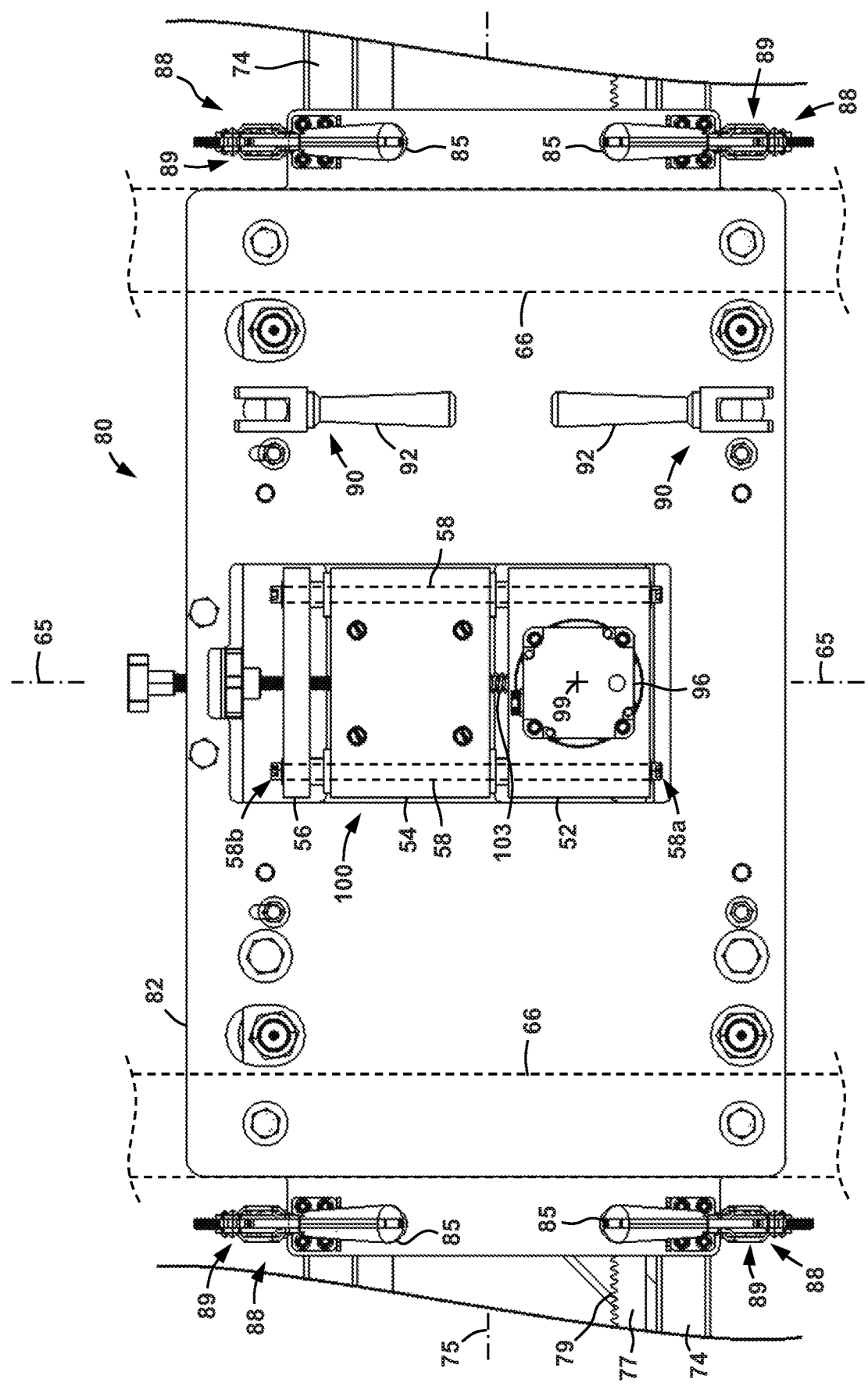
FIG. 11 is a back view of the lateral adjustment assembly of FIG. 9.
Figure 12:
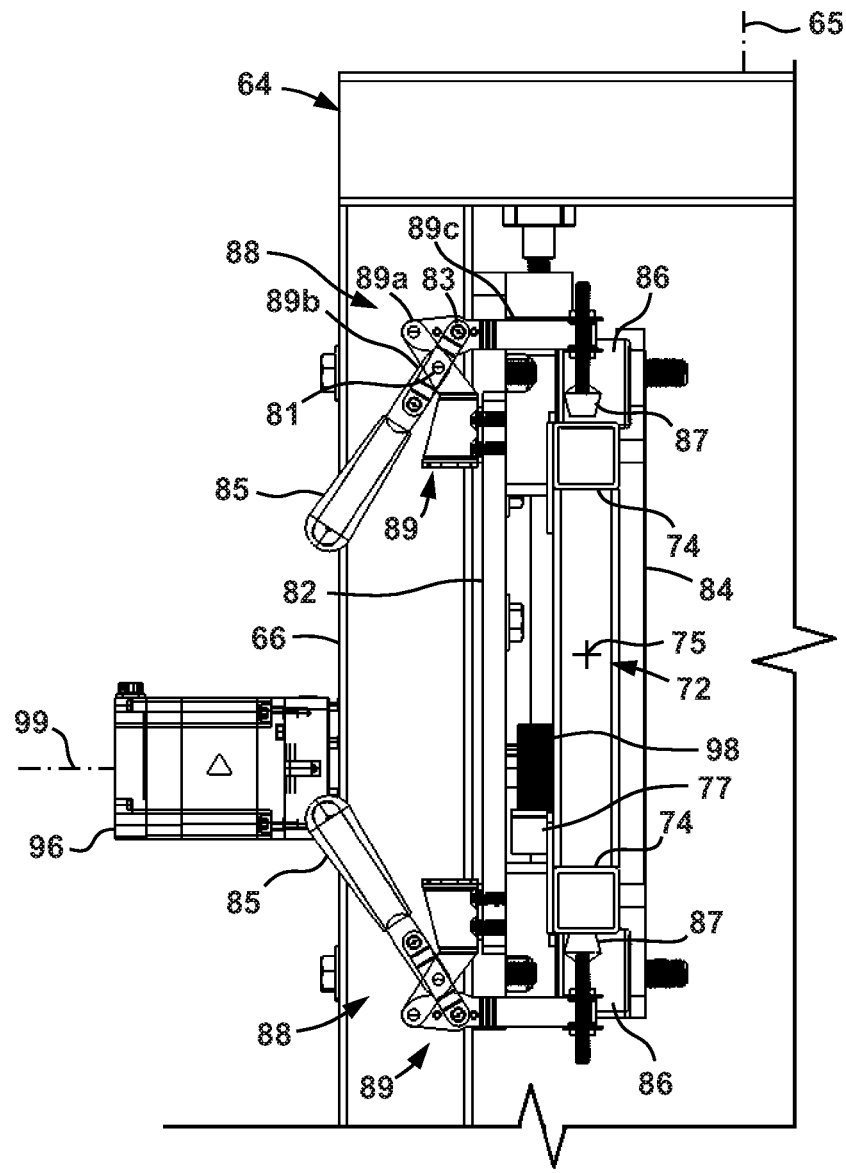
FIG. 12 is a side view of the lateral adjustment assembly of FIG. 9.
Figure 13:
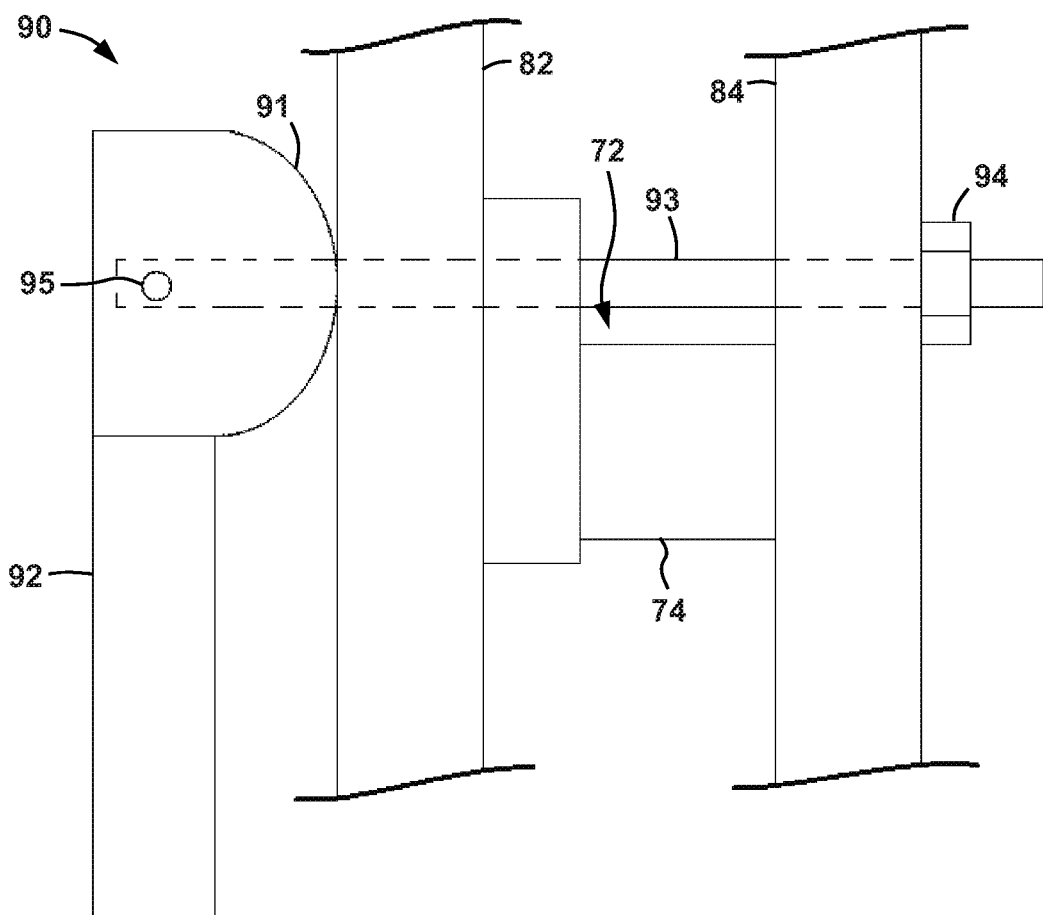
FIG. 13 is an enlarged side view of one of the locking clamps of the lateral adjustment assembly of FIG. 9.

In addition, as best shown in FIGS. 9-11, a pair of locking clamps 90 is included on lateral adjustment assemblies 80 to selectively adjust the spacing between plates 82, 84. Referring briefly to FIG. 13, each locking clamp 90 includes a lever 92, a threaded rod 93 pivotably coupled to lever 92 and extending through plates 82, 84, and an adjustment nut 94 threadably engaged to threaded rod 93. The threaded rod 93 of one of the locking clamps 90 extends through plates 82, 84 and upper mounting block 95, and the threaded rod 93 of the other locking clamp 90 extends through plates 82, 84 and lower mounting block 97. FIG. 13 only depicts the locking clamp 90 that extends through upper mounting block 95 to simply the figure; however, it should be appreciated that the other locking clamp 90 is configured the same (except that threaded rod 93 extends through lower mounting block 97 as previously described). Threaded rod 93 is pivotably coupled to lever 92 at a pinned connection 95. Plates 82, 84 are disposed between lever 92 and adjustment nut 94 along rod 93 such that lever 92 is disposed adjacent first plate 82 and adjustment nut 94 is disposed adjacent second plate 84. Lever 92 includes a convex curved surface 91 that is engaged with first plate 82, so that during operations, lever 92 may be pivoted about pinned connection 95 relative to threaded rod 93 such that convex curved surface 91 engages with plate 81 to force plates 82, 84 toward one another. In some embodiments, lever 92 may be actuated so as to cause plates 82, 84 to engage and compress truss 72 therebetween to further lock or fix the relative positions of vertical support assemblies 60 and vertical bridge assembly 70 during operations. The position of nut 94 along rod 93 is configured to selectively adjust the compression applied to plates 82, 84 and truss 72 when handle 92 is actuated as described above.

Referring again to FIGS. 11 and 14, each truss 72 includes an elongate rack 77 that is mounted to one of the elongate chords 74. Rack 77 includes a plurality of teeth 79 that are axially adjacent one another along axis 75. A driver 96 is mounted to first plate 82 via a connection block assembly 100. Driver 96 includes an output shaft 97 and is configured to rotate shaft 97 about an axis 99 that extends in a direction that is generally perpendicular to the direction of axes 65, 75. Driver 96 may comprise any suitable driver or prime mover for rotating output shaft 97 about axis 99, such as, for example, an electric motor, a hydraulic motor, a pneumatic motor, etc. In this embodiment, driver 96 comprises an electric motor (e.g., a servo motor). In addition, driver 96 is configured to rotate shaft 97 in either direction (e.g., clockwise, counterclockwise, etc.) about axis 99. As best shown in FIG. 14, shaft 97 is coupled to a gear 98 (e.g., pinion gear) including a plurality of teeth 98a that are configured to mesh with the teeth 79 of rack 77 of the corresponding truss 72.

Referring still to FIGS. 11 and 14, connection block assembly 100 is generally the same as connection block assembly 46 previously described above (see e.g., FIG. 6). Thus, connection block assembly 100 includes first block or member 52 mounted to driver 69, second block or member 54 mounted to first plate 82, and third block or member 56, wherein each of the blocks 52, 54, 56 are the same as previously described. In addition, a plurality of connector studs 58 (or more simply "studs 58") extends through each of the blocks 52, 54, 56 in the same manner as previously described above. Specifically, studs 58 are fixed within blocks 52, 56 and are configured to freely slide or translate within block 54. Within connection block assembly 100, studs 58 extend through blocks 52, 54, 56 in a direction that is perpendicular to the direction of axes 75, 14. Further, a biasing member 103 is disposed between first block 52 and second block 54 so as to bias blocks 52, 54 apart from one another along studs 58 and therefore to bias gear 98 into engagement with rack 77 mounted to the corresponding truss 72.

Referring now to FIGS. 3, 9, and 14, during operations, the spacing of vertical support assemblies 60 along axis 14 (and thus also the width $W_{50}$) may be selectively adjusted by actuating drivers 96 to rotate gears 98 about axes 99. The engagement between teeth 98a of gears 98 and the teeth 79 on racks 77 causes lateral adjustment assemblies 80 (and thus also vertical support assemblies 60) to traverse axially along trusses 72 with respect to axis 14. Once a desired position or spacing of vertical support assemblies 60 is achieved, the handles 85 of locking assemblies 88 are actuated so that engagement members 87 engage with elongate chords 34 of trusses 72, thereby fixing the relative positions of vertical support assemblies 60 along trusses 72 of upper bridge assembly 70 as previously described above. The relative position of lateral adjustment assemblies 80 along trusses 72 may also further be fixed by manipulating levers 92 of locking clamps 90 to draw plate 82, 84 toward one another about the corresponding truss 74 as previously described above.

Referring again to FIG. 3, trolley bridge assembly 110 includes a central or longitudinal axis 115 that extends generally parallel to each of the axes 75 of trusses 72 within upper bridge assembly 70 and axis 14. In addition, trolley bridge assembly 110 includes a first end 110a, a second end 110b opposite first end 110a, an elongate base 112, and a pair of elongate trusses 114 mounted to base 112, wherein each of the base 112 and trusses 114 extend axially between ends 110a, 110b. Each truss 114 includes an elongate axially extending chord 116 and a plurality of webs or stiffening members 118 extending between base 112 and chord 116.

Figure 19:
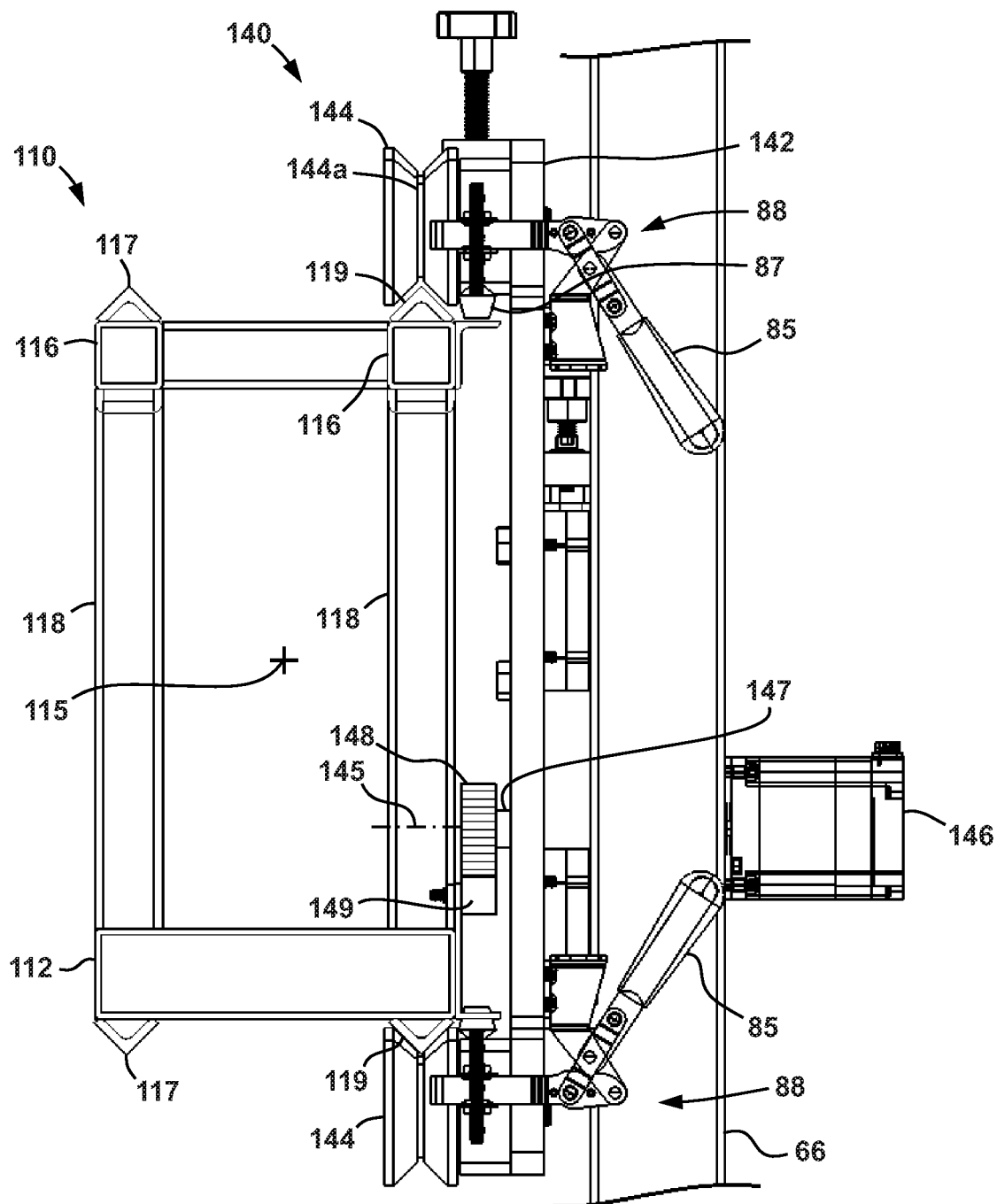
FIG. 19 is a side view of the second vertical adjustment assembly of FIG. 17.

Referring briefly to FIG. 19, a plurality of rails 117, 119 are mounted to trolley bridge assembly 110 that extend axially between ends 110a, 110b. In particular, a pair of first or inner rails 119 extends along the base 112 and one of the elongate chords 116 of trusses 114, and a pair of second or outer rails 117 extends along the base 112 and the other of the elongate chords 116 of trusses 114. Thus, the inner rails 119 are radially spaced from the outer rails 117 about axis 115. Each of the rails 117, 119 comprise an elongate angle member that form tracks extending axially along trolley bridge assembly with respect to axis 115.

Referring again to FIG. 3, trolley bridge assembly 110 is coupled to each of the vertical support assemblies 60 such that trolley bridge assembly 110 may traverse axially along axis 16 during operations. In particular, trolley bridge assembly 110 is movably coupled to one of the vertical support assemblies 60 via a first vertical adjustment assembly 120 proximate second end 110b, and is movably coupled to the other of the vertical support assemblies 60 via a second vertical adjustment assembly 140 proximate first end 110a.

Figure 15:
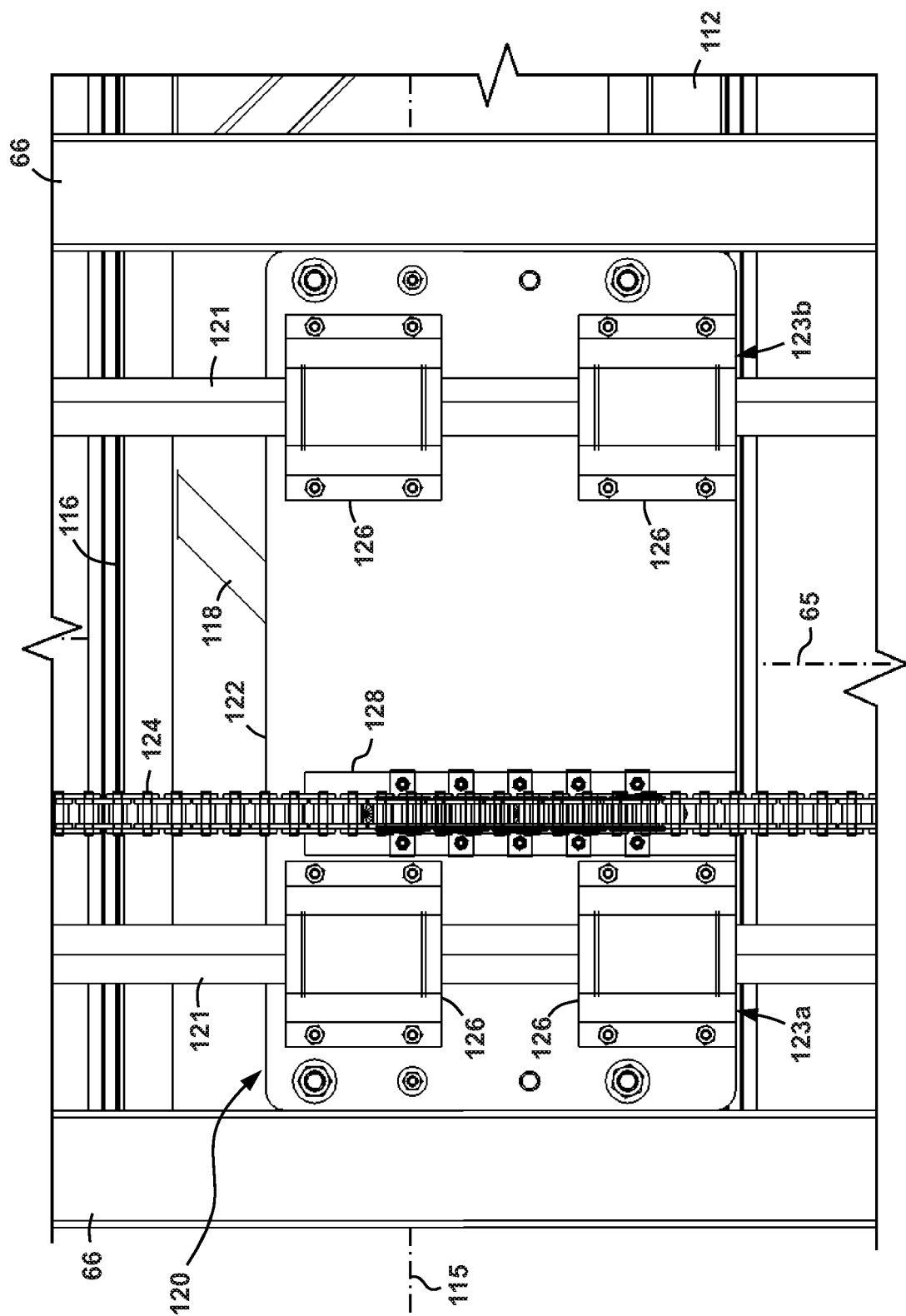
FIG. 15 is a back view of the first vertical adjustment assembly for the trolley bridge assembly of the gantry of FIG. 3.

Referring now to FIGS. 3 and 15, first vertical adjustment assembly 120 includes a mounting plate 122 that is mounted to trolley bridge assembly 110 proximate second end 110b. A plurality of collars 126 are mounted to plate 122. In particular, in this embodiment, there are a total of four collars 126 disposed in two columns 123a, 123b that are axially spaced along axis 115 (or spaced in a radial direction with respect to axis 65 of the corresponding vertical support assembly 60). Each columns 123a, 123b of collars 126 receives one of the pair of guide rods shown as reference numeral 121 in FIG. 15 (which are the same guide rods that are shown as reference numeral 69 in FIG. 8, for example) of the corresponding vertical support assembly 60 axially therethrough with respect to axes 65, 16. Thus, plate 122 (and trolley bridge assembly 110) is free to traverse along axes 65, 16 due to the sliding engagement of guide rods 69 within collars 126.

Figure 16:
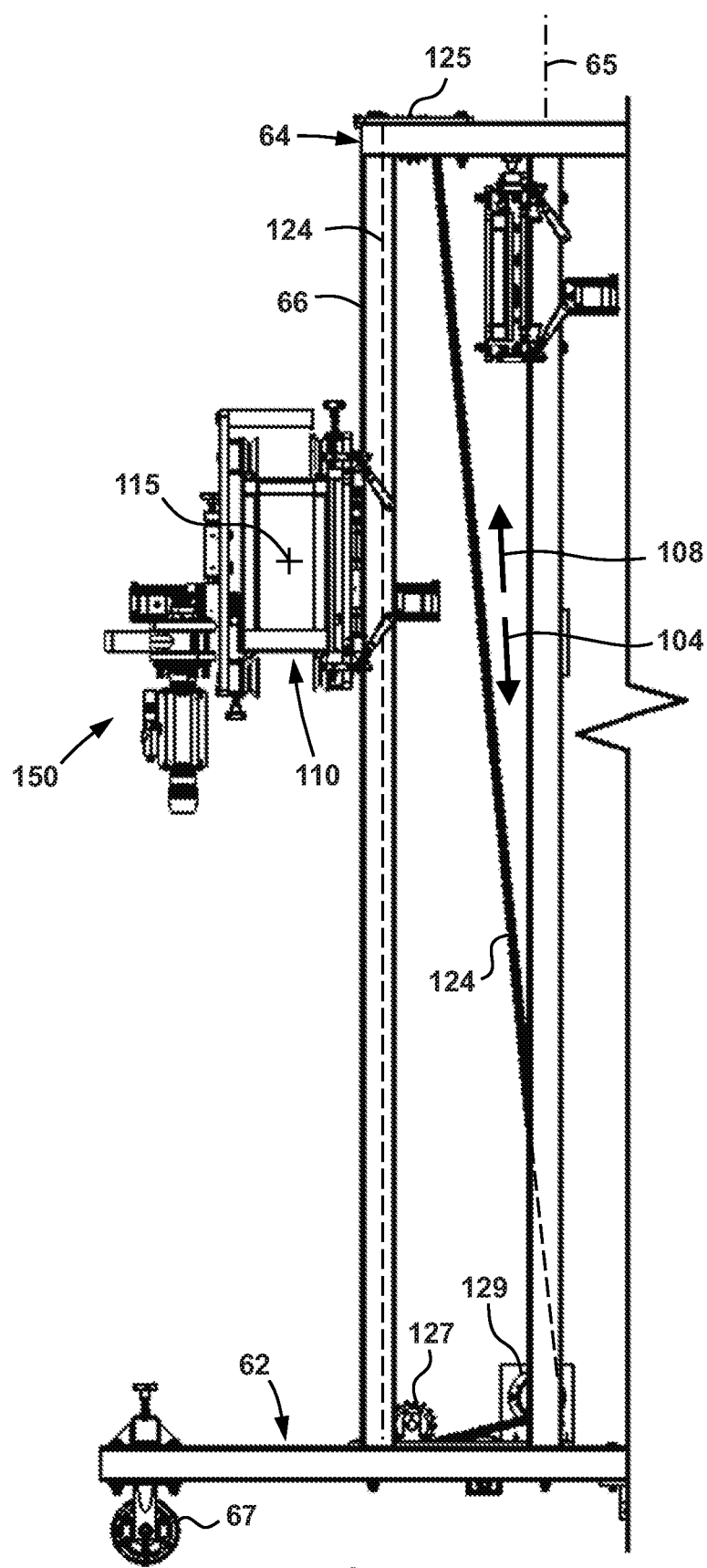
FIG. 16 is an enlarged side view of one of the vertical support assemblies of the gantry of FIG. 3.

Referring now to FIG. 16, each vertical support assembly 60 includes a chain 124 that extends over a first or upper sprocket 125 that is mounted to upper support frame 64 and a second or lower sprocket 127 that is mounter to lower support frame 62. In addition, driver 129 is mounted to lower support frame 62 and is also engaged with chain 124. Driver 129 may comprise any suitable driver, such as those described above for drivers 42, 96. In this embodiment, driver 129 comprises an electric motor (e.g., servo motor). During operations, driver 129 may engage with chain 124 and rotate in one of two directions (e.g., clockwise or counter clockwise) to rotate chain 124 in either a first direction 104 or a second, opposite direction 108 as shown in FIG. 16.

Referring now to FIGS. 15 and 16, first vertical adjustment assembly 120 includes a mounting bracket 128 that is secured to a length of chain 124 and to plate 122. Thus, during operations, as driver 129 rotates chain 124 in directions 104, 108, plate 122 is moved along with chain 124. In particular, when chain 124 is rotated about driver 129, and sprockets 125, 127 in direction 104, plate 122 is moved along axially guide rods shown as reference numeral 121 in FIG. 15 (which are the same guide rods that are shown as reference numeral 69 in FIG. 8, for example) toward upper support frame 64 of vertical support member 60 with respect to axes 65, 16 (or in a vertically upward direction). Conversely, when chain 124 is rotated about driver 129 and sprockets 125, 127 in direction 108, plate 122 is moved axially along guide rods shown as reference numeral 121 in FIG. 15 (which are the same guide rods that are shown as reference numeral 69 in FIG. 8, for example) toward lower support frame 62 of vertical support assembly 60 with respect to axes 65, 16 (or in a vertically downward direction).

Figure 17:
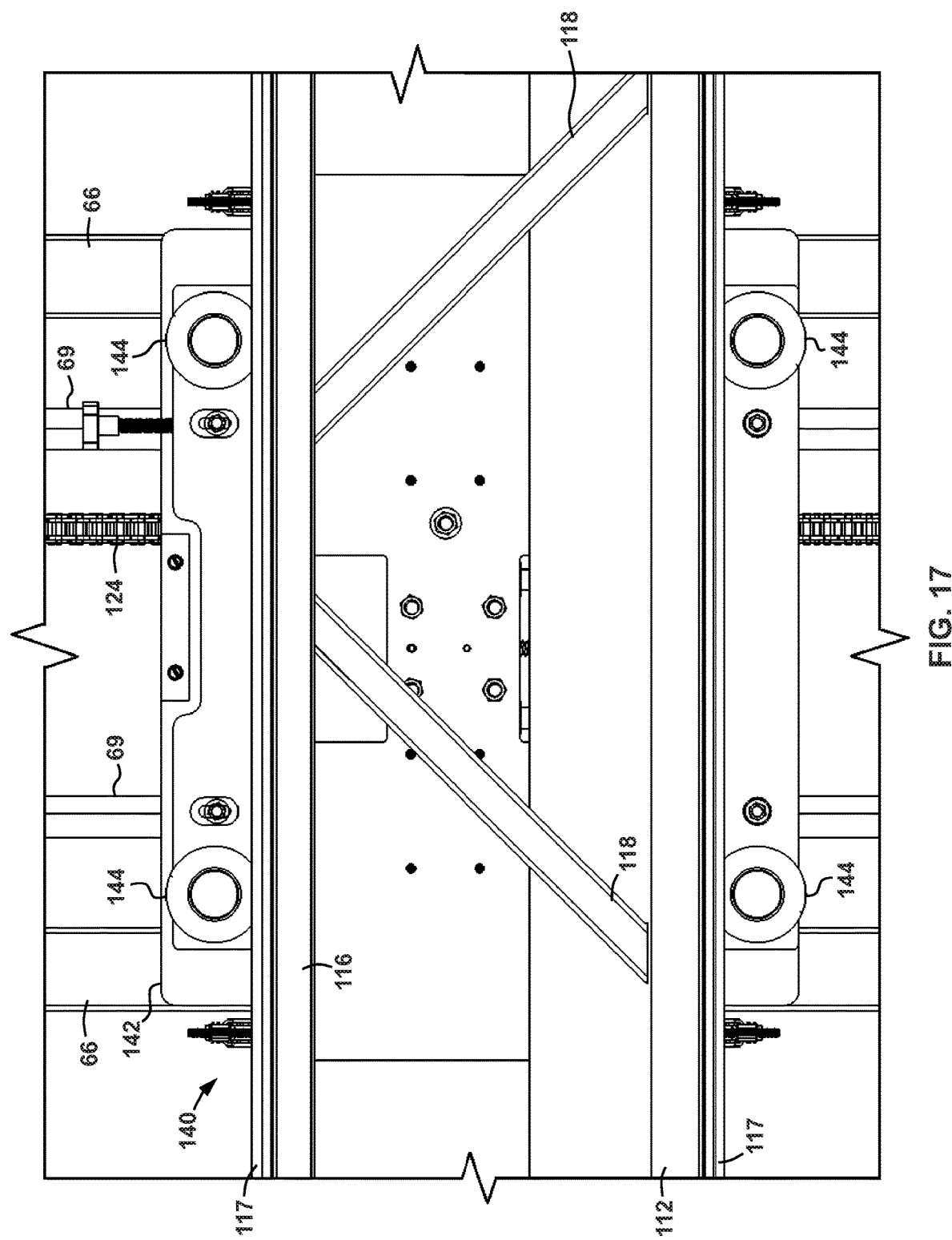
FIG. 17 is a front view of the second vertical adjustment assembly for the trolley bridge assembly of the gantry of FIG. 3.
Figure 18:
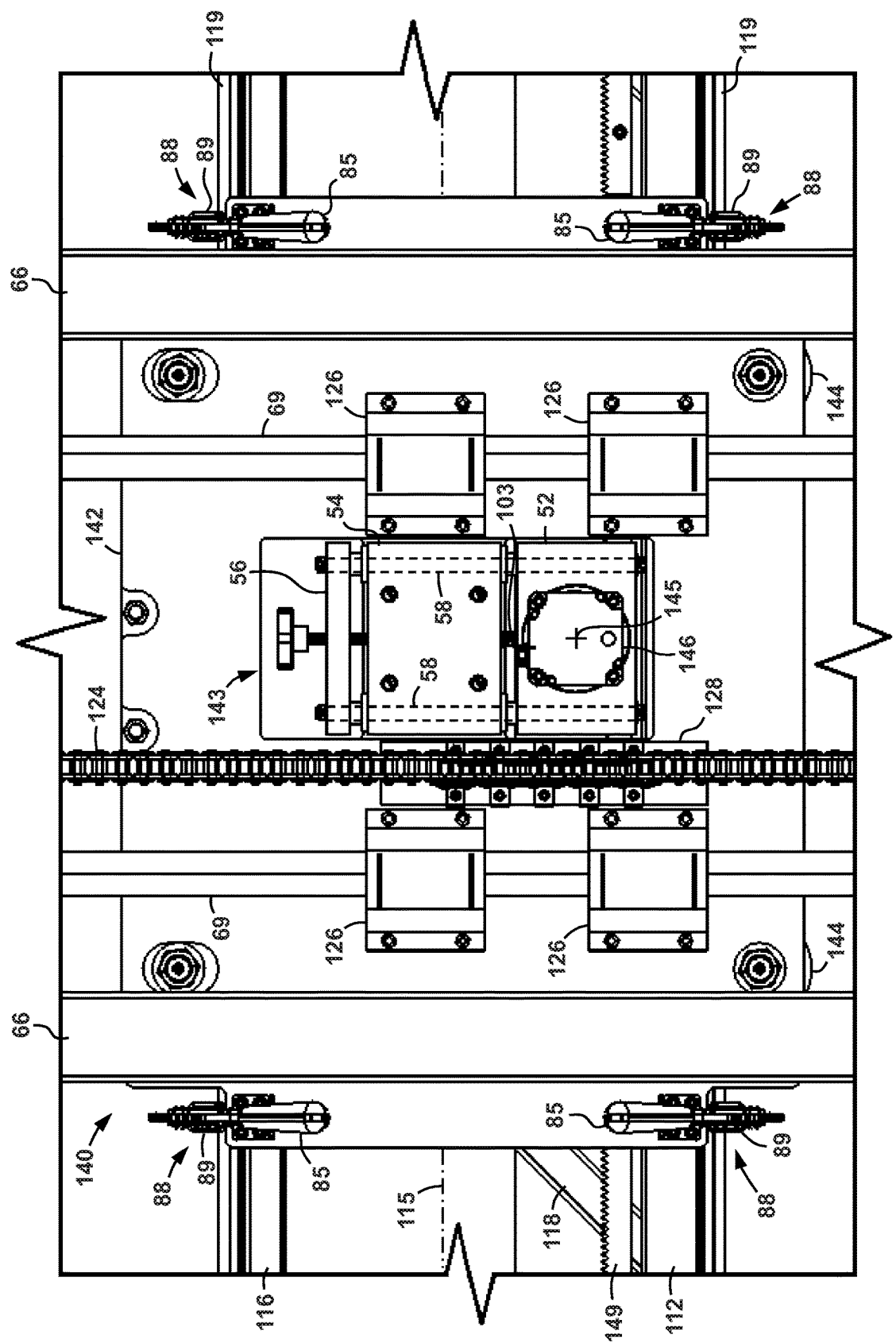
FIG. 18 is a rear view of the second vertical adjustment assembly of FIG. 17.

Referring now to FIGS. 17-19, second vertical adjustment assembly 140 includes a mounting plate 142 that further includes a plurality of collars 126 arranged in a pair of columns 123a, 123b in the same manner as previously described above for first vertical adjustment assembly 120. Thus, collars 126 receive guide rods 96 therethrough to allow plate 142 to traverse axially relative to the corresponding vertical support assembly 60 with respect to axis 65. In addition, second vertical adjustment assembly 140 includes a mounting bracket 128 that is engaged with the chain 29 disposed on the corresponding vertical support assembly 60. Thus, as described with first vertical adjustment assembly 120, during operations, chain 124 may be actuated to move or translate plate 142 axially within vertical support assembly 60 with respect to axis 65 in the same manner described for first vertical adjustment assembly 120.

As best shown in FIGS. 17 and 19, a plurality of rollers 144 is mounted to plate 142. Each roller 144 includes a circumferential channel 144a, which in this embodiment is a v-shaped channel or groove extending circumferentially about roller 144. Two of the rollers 144 are engaged with one of the pair of inner rails 119 while the other two of the rollers 144 are engaged with the other of the pair of inner rails 119. Thus, during operations, the spacing between vertical support assemblies 60 along axes 14, 115 (and thus also the width $W_{50}$—see e.g., FIGS. 1 and 3) may be adjusted via the rolling engagement of rollers 144 and inner rails 119 on trolley bridge assembly 110 (in addition to the rolling engagement of rollers 86 and trusses 72 within upper bridge assembly 70 as previously described above).

A plurality of locking assemblies 88, each being the same as previously described above, are mounted to plate 142 of vertical adjustment assembly 140. Thus, once a desired spacing between vertical support assemblies 60 is achieved, handles 85 of locking assemblies 88 on plate 142 are manipulated to cause engagement members 87 to engage with trolley bridge assembly 110 and thereby lock or fix the relative position of trolley bridge assembly 110 and vertical support assemblies 60 with respect to axis 14 in the same manner previously described for lateral adjustment assemblies 80. Within second vertical adjustment assembly 140, the engagement members 87 of two of the locking assemblies 88 are to engage with the elongate chord 116 of one of the trusses 114 of trolley bridge assembly 110 and the engagement members 87 of the other two of the locking assemblies 88 are to engage with the base 112 of trolley bridge assembly 110.

Referring specifically now to FIG. 19, an elongate rack 149 is mounted to trolley bridge assembly 110. While not specifically shown, elongate rack 149 includes a plurality of teeth that are similar to teeth 36, 79 of racks 32, 77, respectively, previously described above. The teeth (not shown) of rack 149 are axially adjacent one another along axis 115 of trolley bridge assembly 110. In addition, a driver 146 is mounted to plate 142 that includes an output shaft 147 and is configured to rotate shaft 147 about an axis 145 that extends in a direction that is generally perpendicular to the direction of axis 115 of trolley bridge assembly 110 (however, it should be appreciated that such precise alignment may not exist in other embodiments). Driver 146 may comprise any suitable driver or prime mover for rotating output shaft 147 about axis 145, such as, for example, an electric motor, a hydraulic motor, a pneumatic motor, etc. In this embodiment, driver 146 comprises an electric motor (e.g., a servo motor). In addition, driver 146 is configured to rotate shaft 147 in either direction (e.g., clockwise, counterclockwise, etc.) about axis 145. Further, shaft 147 is coupled to a gear 148 (e.g., a pinion gear) that includes a plurality of teeth (not specifically shown) mounted thereto that are configured to mesh with the teeth (not shown) of rack 149. Thus, the rotation of gear 148 about axis 145 is configured to translate the vertical adjustment assembly 140 (as well as the vertical support assembly 60 mounted thereto) axially along trolley bridge assembly 110 with respect to axis 115.

Referring again to FIG. 18, driver 146 (including shaft 147 and gear 148) is mounted to plate 142 via a connection block assembly 143, which is generally the same as connection block assemblies 46, 100 previously described. Thus, connection block assembly 143 includes first block or member 52 mounted to driver 146, second block or member 54 mounted to plate 142, and third block or member 56, wherein each of the blocks 52, 54, 56 are the same as previously described. In addition a plurality of connector studs 58 (or more simply "studs 58") extend through each of the first block 52, second block 54, and third block 56 in the same manner as described above, and biasing member 103 is disposed between first block 52 and second block 54 that is configured to bias first block 52 away from second block 54 along studs 58 as previously described. Thus, biasing member 103 is configured to bias gear 143 into engagement with rack 149 mounted to trolley bridge assembly 110.

Figure 20:
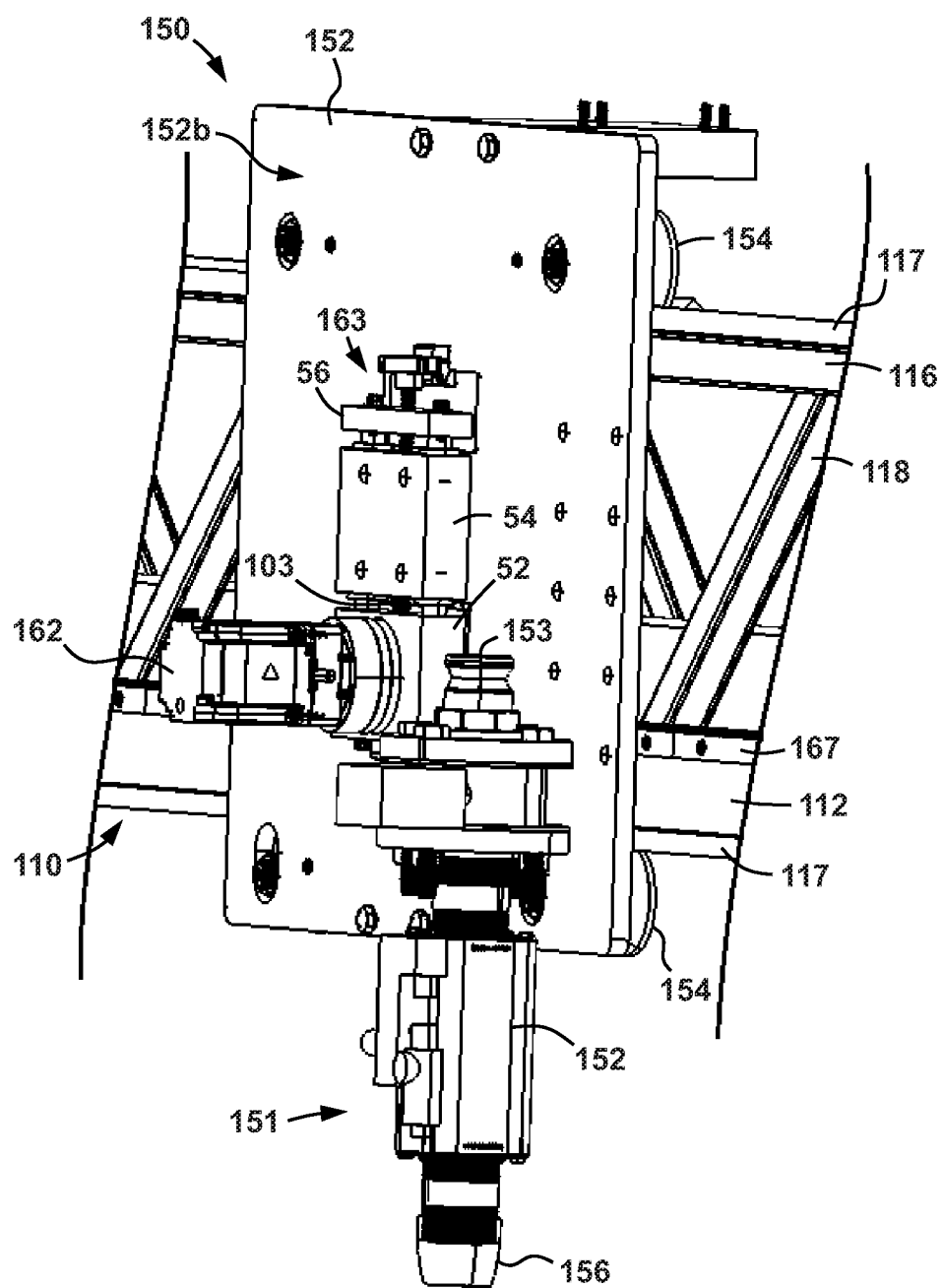
FIG. 20 is a perspective view of the printing assembly of the construction system of FIG. 1.
Figure 21:
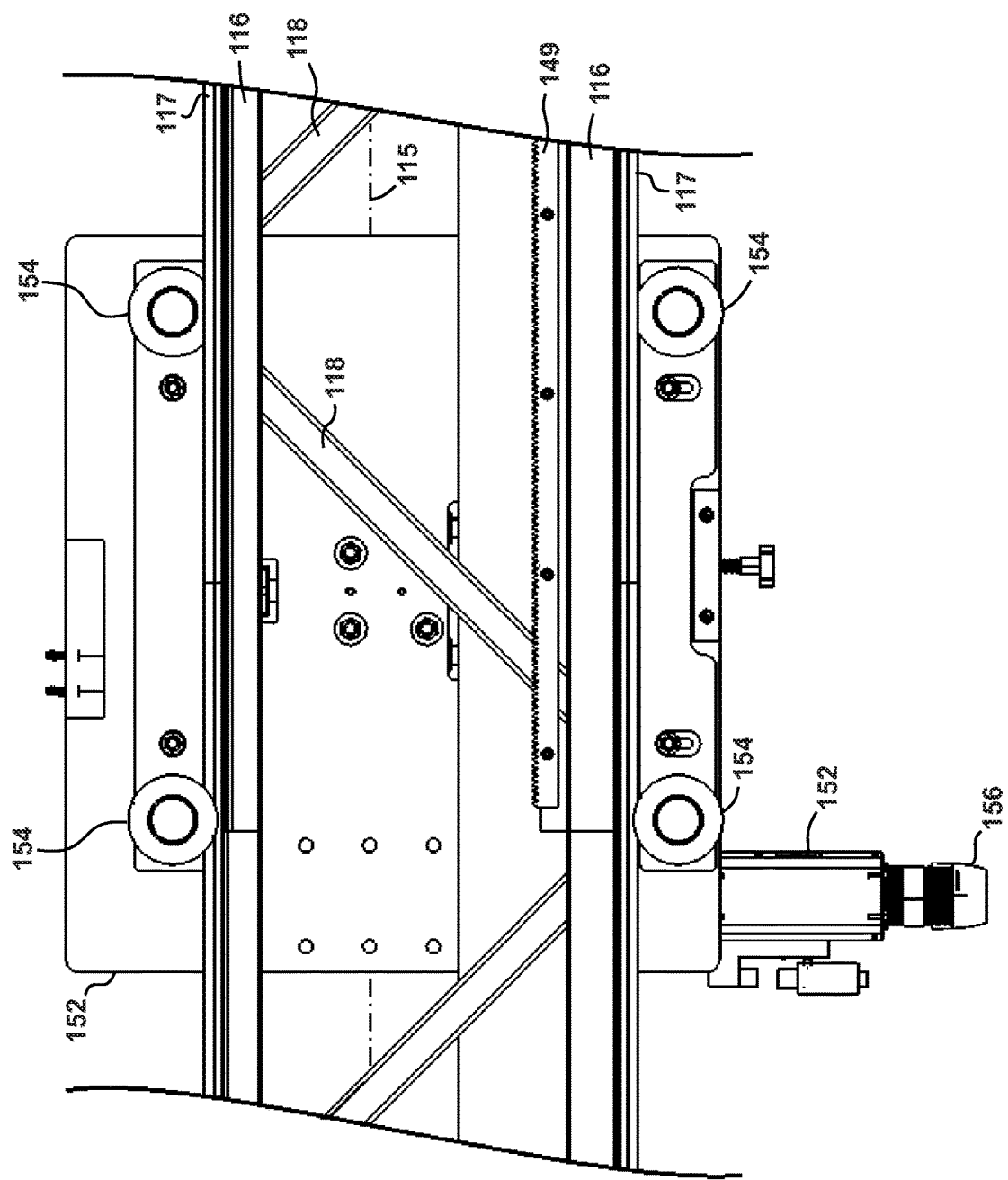
FIG. 21 is a rear view of the printing assembly of FIG. 20.

Referring now to FIGS. 1-3 and 20-22, printing assembly 150 generally includes a support plate 152 movably mounted to trolley bridge assembly 110, and an outflow assembly 151 mounted to plate 152. Support plate 152 includes a first or inner side 152a, and a second or outer side 152b opposite inner side 152a. Outflow assembly 151 is mounted to outer side 152b of plate 152. In addition, a plurality of rollers 154 is mounted to inner side 152a of plate 152. As best shown in FIG. 21, each roller 154 includes a circumferential channel 154a, which in this embodiment is a v-shaped channel or groove extending circumferentially about roller 154. During operations, printing assembly 150 is mounted to trolley bridge assembly 110 such that the channel 154a of each roller 154 is engaged with corresponding ones of the rails 117. In particular, two of the rollers 154 are engaged with the rail 117 disposed on the elongate chords 116 of one of the trusses 114 and the other two rollers 154 are engaged with the rail 117 disposed along base 112. Thus, during operations, plate 152 of printing assembly 150 may traverse axially along trolley bridge assembly 110 with respect to axes 115, 14 via rolling engagement between rollers 154 and rails 117.

Figure 22:
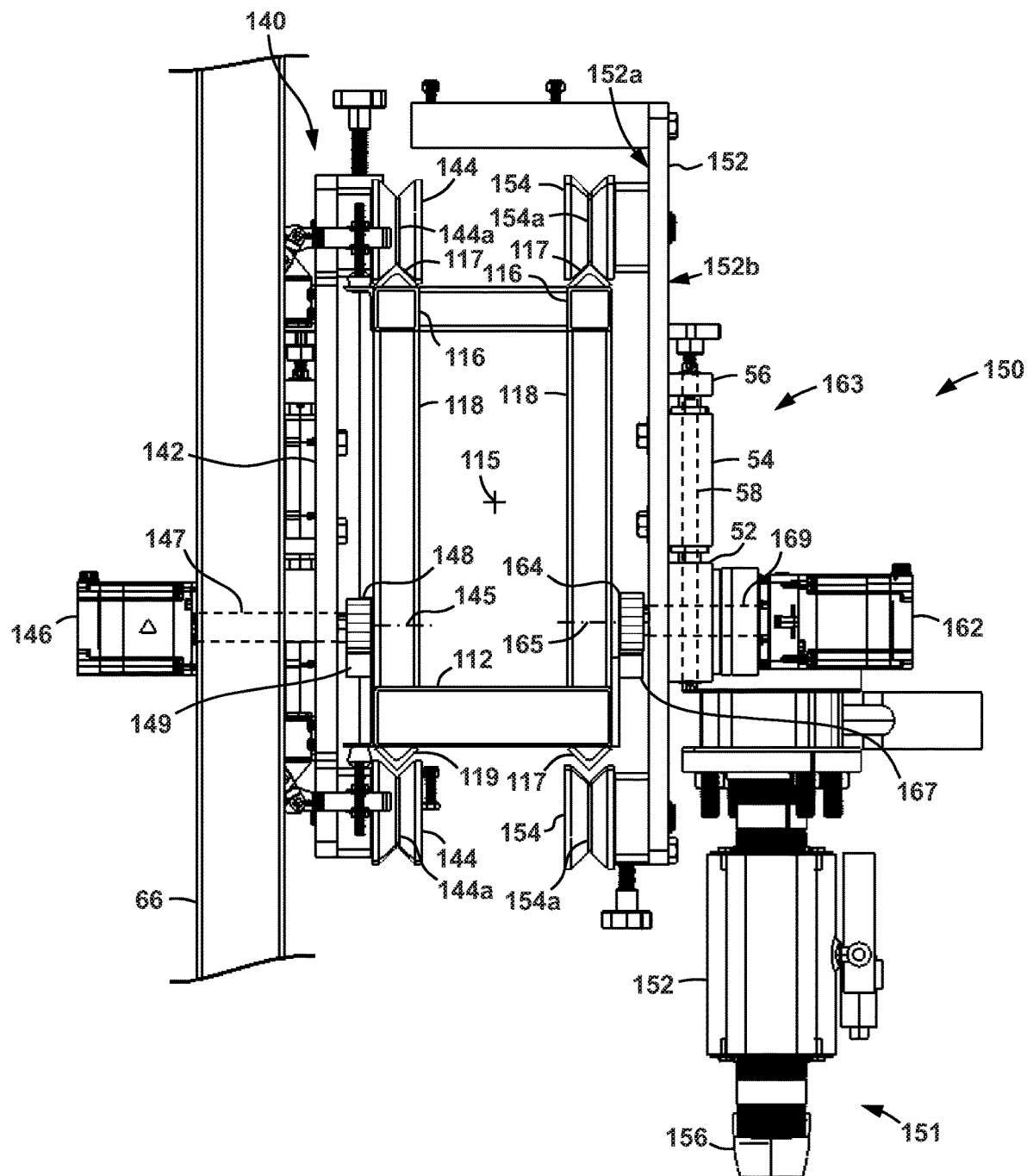
FIG. 22 is a side view of the printing assembly of FIG. 20.

A second elongate rack 167 is mounted to trolley bridge assembly 110. In particular, as best shown in FIG. 22, the second elongate rack 167 is mounted on a side of trolley bridge assembly 110 that is radially opposite the position of rack 149, previously described. While not specifically shown, elongate rack 167 includes a plurality of teeth that are similar to teeth 36, 79 of racks 32, 77, respectively, previously described above. The teeth (not shown) of rack 167 are axially adjacent one another along axis 115 of trolley bridge assembly 110. In addition, a driver 162 is mounted to outer side 152b of plate 152 that includes an output shaft 169 extending from outer side 152b to inner side 152a of plate 152 and that is configured to rotate shaft 169 about an axis 165 that extends in a direction that is generally perpendicular to the direction of axis 115 of trolley bridge assembly 110 (however, it should be appreciated that such precise alignment may not exist in other embodiments). Driver 162 may comprise any suitable driver or prime mover for rotating output shaft 169 about axis 165, such as, for example, an electric motor, a hydraulic motor, a pneumatic motor, etc. In this embodiment, driver 162 comprises an electric motor (e.g., a servo motor). In addition, driver 162 is configured to rotate shaft 169 in either direction (e.g., clockwise, counterclockwise, etc.) about axis 165. Further, shaft 169 is coupled to a gear 164 (e.g., a pinion gear) that includes a plurality of teeth (not specifically shown) mounted thereto that are configured to mesh with the teeth (not shown) of rack 167. Thus, the rotation of gear 162 about axis 165 is configured to translate the printing assembly 150 axially along trolley bridge assembly 110 with respect to axes 115, 14, between vertical support assemblies 60 during operations.

Referring now to FIGS. 20 and 22, driver 162 (including shaft 169 and gear 164) is mounted to plate 152 via a connection block assembly 163, which is generally the same as connection block assemblies 46, 100, 143 previously described. Thus, connection block assembly 163 includes first block or member 52 mounted to driver 162, second block or member 54 mounted to plate 152, and third block or member 56, wherein each of the blocks 52, 54, 56 are the same as previously described. In addition a plurality of connector studs 58 (or more simply "studs 58") extend through each of the first block 52, second block 54, and third block 56 in the same manner as described above, and biasing member 103 is disposed between first block 52 and second block 54 that is configured to bias first block 52 away from second block 54 along studs 58 as previously described. Thus, biasing member 103 is configured to bias gear 164 into engagement with rack 167 mounted to trolley bridge assembly 110 during operations.

Referring now to FIGS. 1, 3, 20, and 22, outflow assembly 151 generally includes a valve 152 and an outlet nozzle 156 that is downstream of valve 152. During operations, extrudable building material is provided to outflow assembly 151 via a supply conduit 155 that is routed trolley bridge assembly 110 on base 112 and between trusses 114 (note: only a small section of supply conduit 155 is shown in FIG. 3, and the section of supply conduit 115 connected to outflow assembly 151 on printing assembly 150 is not shown so as to simply the figure). In particular, the supply conduit 155 is coupled to outflow assembly 151 at a connector 153 upstream of valve 152, so that extrudable building material may be delivered to and through valve 152 and then to outlet nozzle 156 so that it may be deposited onto foundation 4 (see FIGS. 1 and 2) during construction operations.

Supply conduit 155 is configured to deliver an extrudable building material (e.g., a cement mixture) from a source (not shown in FIG. 3), which may comprise any suitable tank, hopper, vessel, etc. that is configured to contain a volume of extrudable building material therein. For example, in some embodiments, the source may comprise a tank, a cement mixer (e.g., such as that found on a stand-alone cement mixer or on a cement truck), or other suitable container, and may be disposed immediately adjacent foundation 4 and gantry 50, or may be relatively remote from foundation 4 and gantry 50. In this embodiment, supply conduit 155 comprises a hose; however, other suitable conduits or channels for delivering the extrudable building material from the source may be used in other embodiments (e.g., pipes, open channels, tubing, etc.).

Referring still to FIGS. 1, 3, 20, and 22, valve 152 is an actuatable member that is configured to selectively close off or adjust the flow of extrudable building material to outlet nozzle 156 during operations. In some embodiments, valve 152 comprises a pinch valve; however, other valve designs or arrangement may be used in other embodiments (e.g., ball valve, gate valve, butterfly valve, etc.). Valve 152 may be actuated between a fully open position, where valve 152 has little to no effect on the flow rate of building material flowing to outlet nozzle 156, and a fully closed position, where valve 156 prevents all extrudable building material from progressing to outlet nozzle 156 from supply conduit 155. In addition, valve 152 may also be actuated to a plurality of positions that are between the fully open and fully closed positions to progressively adjust the flow of building material to outlet nozzle 156. Further, in this embodiment, valve 152 is pneumatically actuated with compressed air; however, other actuation methods are possible, such as, for example, electrical actuation, hydraulic actuation, mechanical actuation, or some combination thereof.

Referring now to FIGS. 1, 3, 20, and 23, during a construction operation, printing assembly 150 is traversed along axes 12, 14, 16 about foundation 4 via gantry 50 and rail assemblies 20. Simultaneously, printing assembly 150 is actuated (e.g., via a pump assembly 105) to extrude or deposit building material (e.g., a cement mixture) in a plurality of vertically stacked layers 5a thereby forming structure 5 on top surface 4a of foundation 4. In particular, during these operations printing assembly 150 is traversed along the axis 12 via actuation of drivers 42 and the engagement between teeth 44 on gears 43 and teeth 36 on elongate racks 32 mounted on rail assemblies 20 (see FIGS. 6 and 7). In addition, printing assembly 150 is traversed along axis 14 via actuation of driver 162 and the engagement between the teeth on gear 164 and the teeth on elongate rack 167 mounted to trolley bridge assembly 110 (see FIG. 22). Further, printing assembly 150 is traversed along the axis 16 via actuation of drivers 129 and chains 124 mounted to vertical support assemblies 60 and the corresponding sliding engagement between collars 126 on vertical adjustment assemblies 120, 140 and guide rods 69 on vertical support assemblies 60 (see FIGS. 4, 15, and 18). Thus, the selective actuation of drivers 42, 162 causes printing assembly 150 to be controllably maneuvered within a plane that is parallel to top surface 4a of foundation 4, and the selective actuation of drivers 129 causes printing assembly 150 to be controllably translated vertically (or along axis 16).

Figure 23:
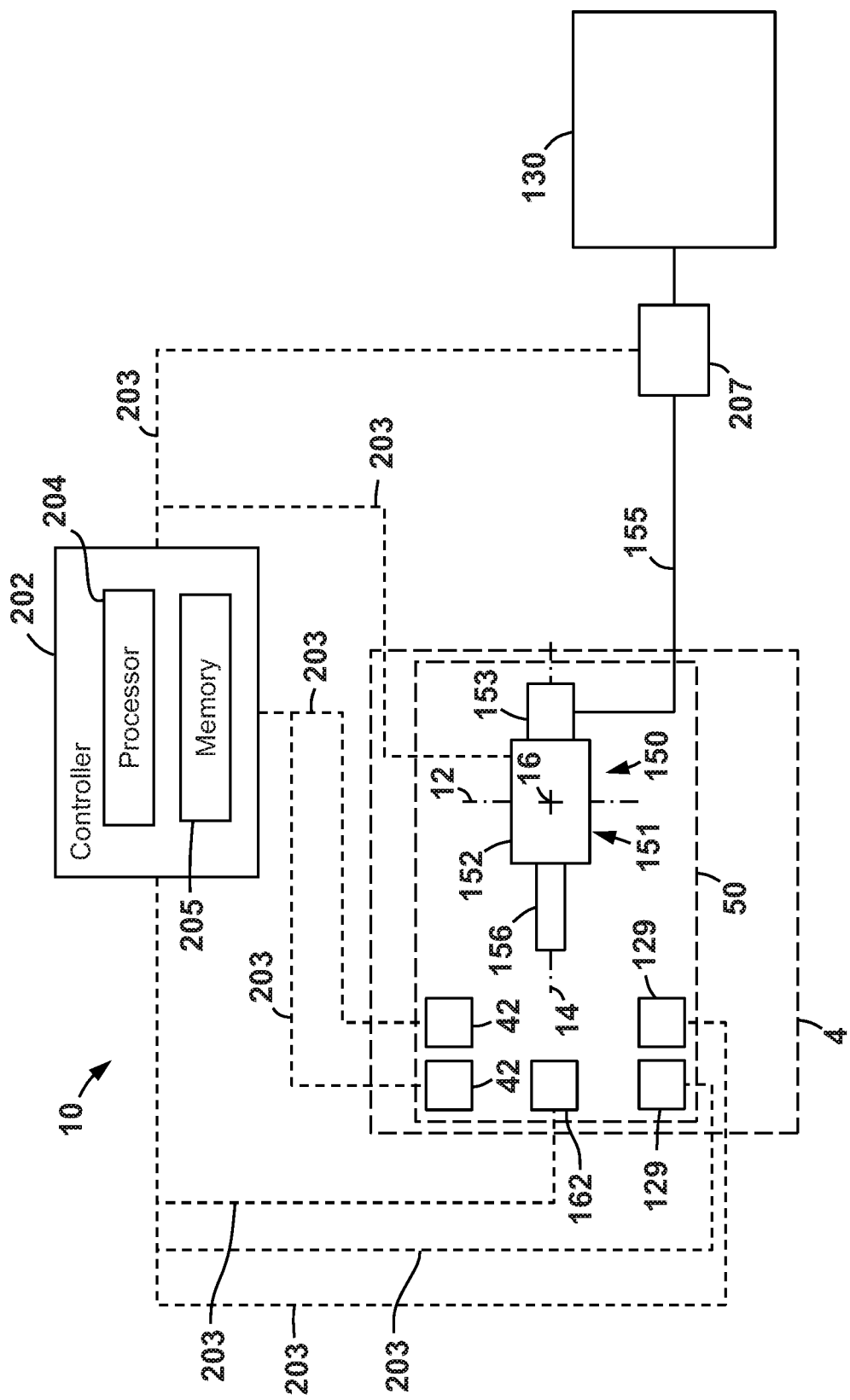
FIG. 23 is a block diagram of the construction system of FIG. 1.

The above described actuation of drivers 42, 162, 129 may be monitored and controlled by a central controller 202 (see FIG. 23). Controller 202 may comprise any suitable device or assembly which is capable of receiving an electrical or informational signal and transmitting various electrical, mechanical, or informational signals to other devices (e.g., valve 201, pump assembly 105, etc.). In particular, in this example, controller 202 includes a processor 204 and a memory 205. The processor 204 (e.g., microprocessor, central processing unit, or collection of such processor devices, etc.) executes machine readable instructions provided on memory 205 to provide the processor 204 with all of the functionality described herein. The memory 205 may comprise volatile storage (e.g., random access memory), non-volatile storage (e.g., flash storage, read only memory, etc.), or combinations of both volatile and non-volatile storage. Data consumed or produced by the machine readable instructions can also be stored on memory 205. A suitable power source may also be included within or coupled to controller 202 to provide electrical power to the components within controller 202 (e.g., processor 204, memory 205, etc.). The power source may comprise any suitable source of electrical power such as, for example, a battery, capacitor, a converter or a local power grid, etc.

Controller 202 may be coupled to each of the drivers 42, 162, 129 via a plurality of communication paths 203. Communication paths 203 may comprise any suitable wired (e.g., conductive wires, fiber optic cables, etc.) or wireless connection (e.g., WIFI, BLUETOOTH®, near field communication, radio frequency communication, infrared communication, etc.). In this embodiment, communications paths 203 comprise conductive wires that are configured to transmit power and/or communication signals during operations. In addition, as shown in FIG. 23, controller 202 is also coupled to a pump 207 via an additional conductive path 203. Pump 207 is fluidly coupled between printing assembly 150 and a supply tank or vessel 130 that holds or retains a volume of extrudable building material therein. As will be described in more detail below, pump 207 is configured to induce a flow of the extrudable building material from supply tank 130 to printing assembly 150 via supply conduit 155 when desired.

During operations, controller 202 selectively actuates drivers 42, 162, 129 to controllably maneuver printing assembly 150 along each of the axes 12, 14, 16, as previously described. In addition, controller 202 also actuates pump 207 to controllably flow extrudable building material from supply tank 130 to outlet nozzle 156 of outflow assembly 151. Specifically controller 202 selectively maneuvers printing assembly 150 along axes 12, 14, 16 and emits building material from outlet nozzle 156 per machine readable instructions (e.g., software) that are stored on memory 205 and executed by processor 204. Some embodiments of the machine readable instructions are discussed in more detail below; however, it should be appreciated that by executing the machine readable instructions, layers (e.g., layers 5a in FIG. 1) of extrudable building material are deposited on foundation 4 such that a structure (e.g., structure 5) is formed or printed from top surface 4a of foundation 4 upward via construction system 10. More particularly, during operations, beads or lines of extrudable building material are deposited by printing assembly 150 so as to form a vertical layer 5a of structure 5, and then the printing assembly 150 is raised and once again maneuvered over the previously printed layer 5a to thereby deposit another vertical layer 5a of structure 5a atop the first printed layer 5a. Referring briefly to FIGS. 3, in this embodiment, controller 202 may be disposed within a storage cabinet 209 that is mounted or secured to one of the vertical support assemblies 60 of gantry 50. However, it should be appreciated that the location of controller 202 may be varied in other embodiments.

Referring still to FIGS. 3, 20, and 23, controller 202 is also coupled to valve 152 via a communication path 203 and is configured to actuate valve 152 between the fully open position, the fully closed position, and to the plurality of positions that are between the fully open and fully closed positions to progressively adjust the flow of building material emitted from outlet nozzle 156. During operations, controller 202 may actuate valve 152 (e.g., via a compressed air or other actuation system) to a desired position. In some embodiments, controller 202 is configured to actuate valve 152 based on a number of factors, such as, for example, the operating status of pump 207, the portion of the structure (e.g., structure 5 shown in FIG. 1) that is to be constructed (e.g., printed), the length of supply conduit 155 between pump 207 and valve 152 (and/or outflow conduit 110), etc.

Figure 24:
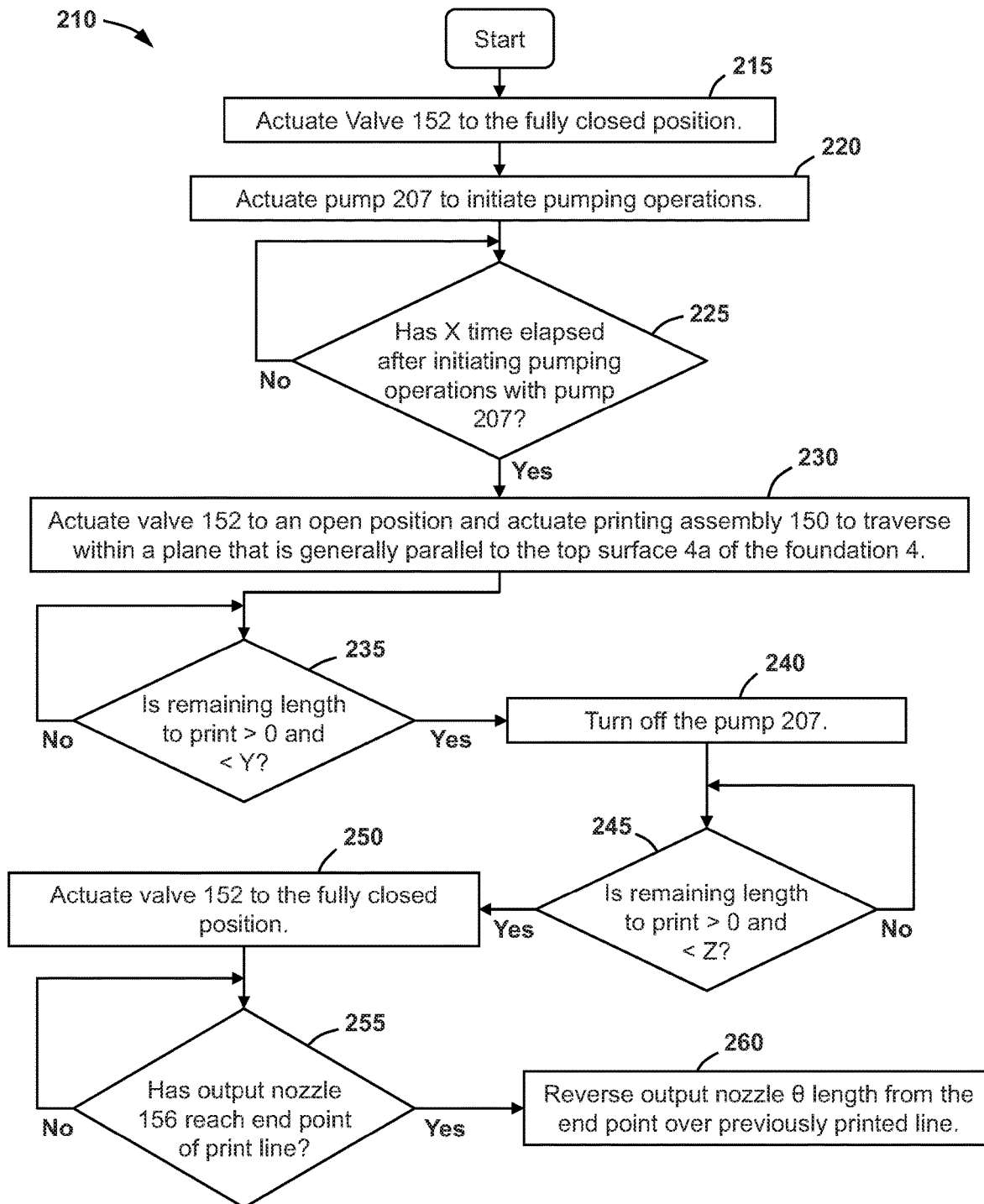
FIG. 24 is a flow chart of a method for printing a structure according to some embodiments disclosed herein.

Without being limited to this or any other theory, the actuation of valve 152 may allow for precise control of the outflow of extrudable building material from outlet nozzle 156 during operations. For example, referring now to FIGS. 1-3, 23, and 24, a method 210 for printing or depositing a layer of extrudable building material (e.g., a cement mixture) is shown. Method 210 may be practiced wholly or partially by controller 202 (e.g., by processor 204 executing machine readable instructions stored on memory 205) within construction system 10. As a result, continuing reference is made to construction system 10 in describing the features of method 210 of FIG. 24 and continuing reference is made to FIGS. 1-3 and 23 in addition to FIG. 24. However, it should be appreciated that other assemblies, systems, and/or personnel may be used to carry out method 210 in other embodiments. Thus, in describing method 210, references to the actions or functions of controller 202 or the features of construction system 10 are meant to explain or describe particular embodiments of method 210 and should not be interpreted as limiting all possible embodiments of method 210.

Initially, method begins by actuating valve 152 within outlet assembly 151 to the fully closed position at 215. As a result, extrudable printing material is prevented from flowing out of outlet nozzle 156. Next, method 210 includes actuating pump 207 at 220 to initiate the flow of extrudable building material from supply tank 130 toward printing assembly 150 at 220. However, even after the valve 152 is actuated at 220, the flow of extrudable building material is prevented from exiting outlet nozzle 156 by the closed valve 152. Next, at 225, method enquires as to whether a time X has elapsed after actuating pump 207 to begin pumping extrudable building material from supply tank 130. The time X may be set or configured to allow the extrudable building material to fill the supply conduit 155 between pump 207 and outflow assembly 151 such that the flow of extrudable building material from outlet nozzle 156 may begin relatively quickly (e.g., nearly immediately) after opening valve 152. Thus, the value or range of time X may vary depending on a variety of factors, such as, for example, the length of supply conduit 155, the flow rate from pump 207, the viscosity of the extrudable building material, etc. If, at 225, it is determined that the time X has not elapsed since actuating the pump 207 in 220 (i.e., the determination at 225 is "No"), then method 210 repeats block 225 to once again enquire as to whether time X has elapsed. If, on the other hand, it is determined at 225 that time X has elapsed (i.e., the determination at 225 is "Yes"), then method 210 proceeds to actuate valve 152 to an open position (e.g., the fully open position or a partially open position) and to actuate the printing assembly 150 to traverse along the foundation 4 to deposit a layer 5a of structure 5 at 230. In particular, as previously described above, within block 230, controller 202 may actuate drivers 42, 162 to maneuver printing assembly 150 within a plane that is parallel to top surface 4a of foundation 4 while extrudable building material is emitted from outlet nozzle 156 via the open valve 152 so that a layer 5a of structure 5 is deposited thereon. During these operations, it may be desirable to deposit an entire layer 5a of structure 5 in series of continuous lateral movements of printing assembly 150 (e.g., via gantry 50) while the valve 152 remains in the open position within 230. However, it should be appreciated that the lateral movements of printing assembly 150 at 230 may comprise a plurality of non-continuous movements (whereby the valve 152 is actuated between the open and closed position to start and stop the flow of extrudable building material therethrough during the non-continuous movements).

Referring still to FIGS. 1-3, 23, and 24, at 235, method 210 enquires as to whether the remaining length of extrudable building material to print within a given layer 5a is greater than zero and less than Y at 235. The length Y may be set or configured to correspond to the expected printing length that may be carried out after the pump 207 is turned off such that additional extrudable building material is no longer being provided into supply conduit 155 from supply tank 130. Thus, the length Y may vary depending on a variety of factors, such as, for example, the length of supply conduit 155, the flow rate from pump 207, the speed of movement of printing assembly 150 across foundation, the thickness of the printed beads or lines of extrudable building material, etc. If it is determined at 235 that the remaining length to print within a given layer 5a is greater than length Y (i.e., the enquiring at block 235 is "No") then method 210 repeats the enquiry at block 235. If, on the other hand, it is determined at 235 that the remaining length to print within a given layer 5a is greater than zero and less than Y, then method 210 proceeds to turn off the pump 207 at 240.

Next method 210 enquires as to the remaining length to print within a given layer is greater than zero and less than Z at 245. The length Z may be set or configured to correspond to the expected printing length that may be carried out once the valve 152 is closed. In particular, as may be appreciated in FIG. 20, because the valve 152 is disposed upstream of outlet nozzle 156, some extrudable building material (e.g., the amount of material that may be disposed between the valve 152 and the outlet of nozzle 156) may be emitted from nozzle 156 after valve 152 is actuated to the fully closed position. Thus, like the length Y at block 235, the length Z may vary depending on a variety of factors, such as, for example, the length and volume between valve 152 and outlet nozzle 156, the speed of movement of printing assembly 150 across foundation, the thickness of the printed beads or lines of extrudable building material, etc. In various embodiments, the length Z is less than the length Y. If it is determined at 245 that the remaining length to print within a given layer 5a is greater than Z (i.e., the enquiring at block 245 is "No") then method 210 repeats the enquiry at block 245. If, on the other hand, it is determined at 245 that the remaining length to print within a given layer 5a is less than Z, then method 210 proceeds to actuate the valve 152 to the fully closed position at 250.

Next, method 210 enquires as to whether the output nozzle 156 has reached the end point of the layer 5a being printed at 255. If, for example, it is determined that the output nozzle 156 has not reached the end point of the given layer 5a (i.e., the determination at 255 is "No"), then method 210 repeats the enquiry at 255. If, on the other hand, it is determined that the output nozzle 156 has reached the end point of the given layer 5a at 255 (i.e., the determination at 255 is "Yes"), then method 210 includes reversing the output nozzle a length θ over the previously printed line at 260. For instance, once the printing assembly 150 has reached an end point of a (or the) line forming a given layer 5a of structure 5, controller 202 may then maneuver the printing assembly 150 such that outlet nozzle 156 reverses direction and retraces some length (e.g., length θ) over the previously printed line. Without being limited to this or any other theory, the movement at 260 may allow extrudable building material to be wiped or removed from outlet nozzle 156 by engagement with the previously printed bead or line. Thus, when a subsequent layer 5a or line is to be printed by printing assembly following method 210, the nozzle 156 may be substantially clear of previously extruded building material.

Figure 25:
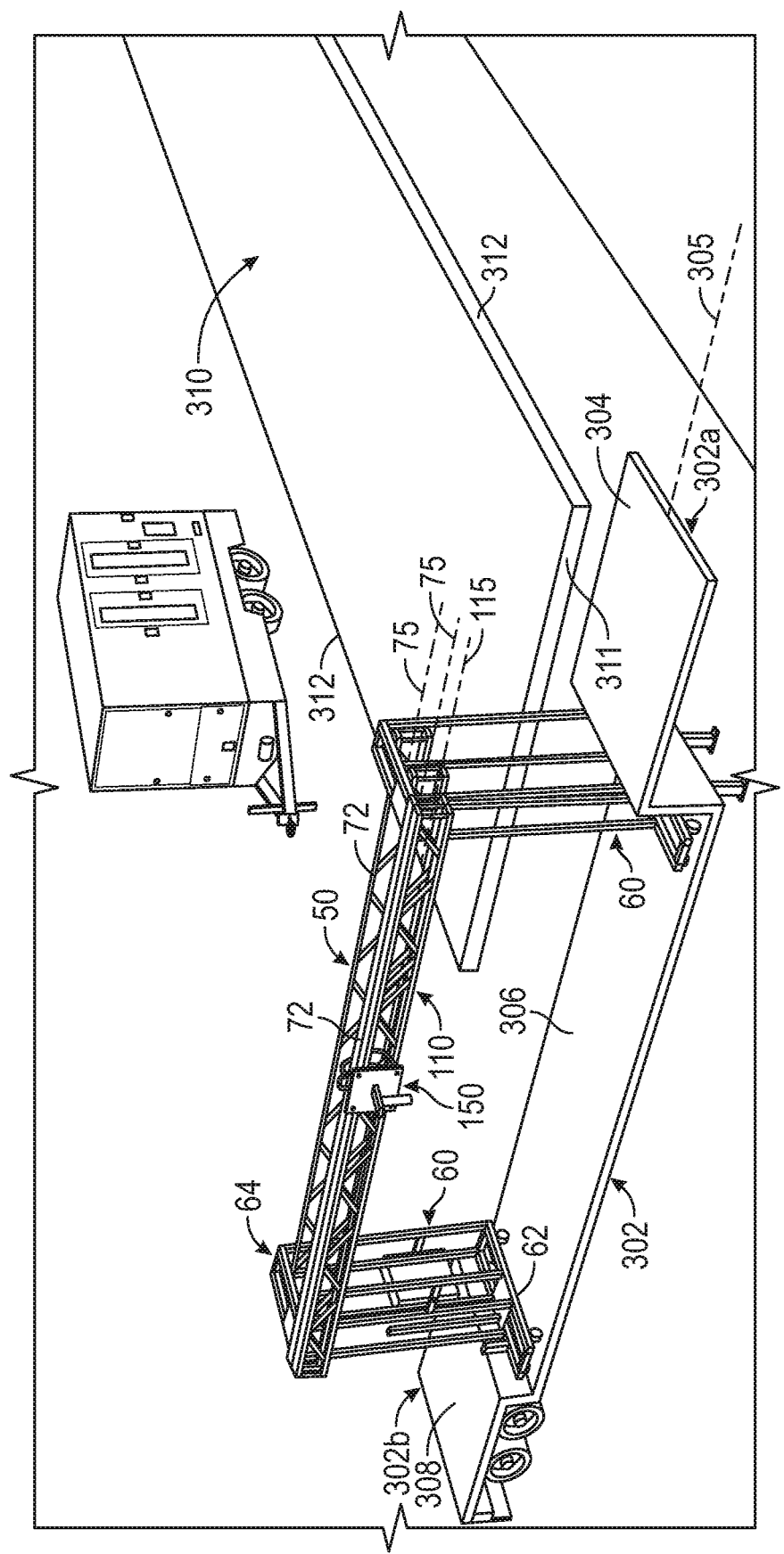
FIGS. 25-27 are sequential, perspective views of an example construction operations utilizing the construction system of FIG. 1 according to some embodiments.
Figure 26:
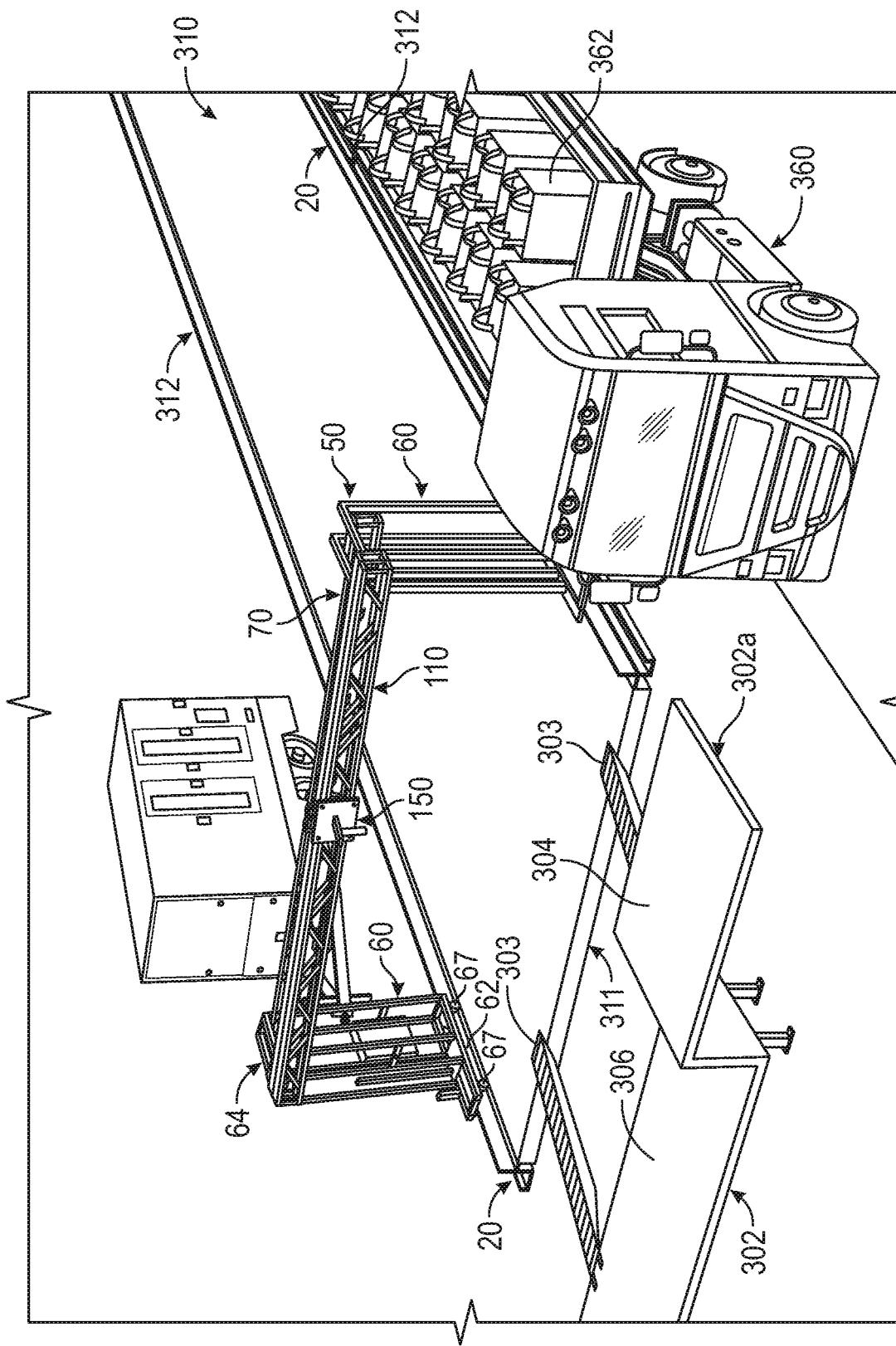
Figure 27:
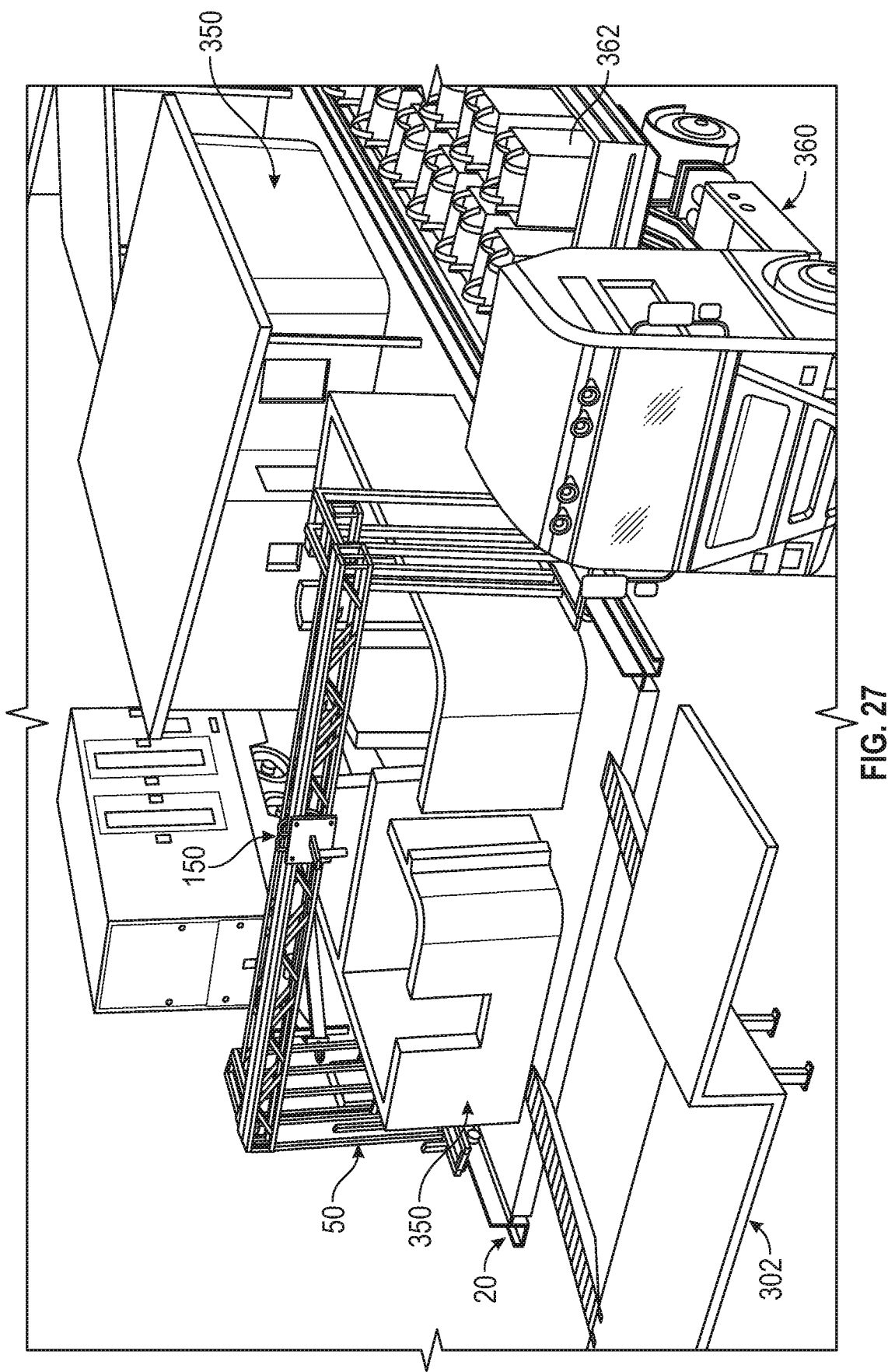

When performing a printing operation of a structure, construction system 10 (including gantry 50) may be delivered on a truck-pulled trailer to the build site (which may already have a foundation in place). For instance, referring now to FIGS. 25-27, a series of sequential views of an example construction process utilizing construction system 10 are shown. Generally speaking, FIGS. 25 and 26 show the delivery and initial set-up of construction system 10 on an existing foundation 310, and FIG. 27 depicts construction system 10 during a printing operation of multiple structures 350 on foundation 310. In the process depicted in FIGS. 25-27, a plurality of structures 350 are constructed (e.g., printed) by construction system 10 on a single, elongated foundation 310. Such a construction process may be useful or desirable for constructing structures (e.g., dwellings) for a population that lives within a fairly remote or economically disadvantaged area. For instance, such a construction process may be useful or desirable for constructing multiple family homes within a rural village.

Referring specifically first to FIG. 25, initially the gantry 50 of construction system 10 is delivered to a construction site via a truck-pulled trailer 302. In this embodiment, trailer 302 is a so-called "drop-deck" flatbed trailer that includes a longitudinal axis 305, a first or front end 302a, a second or rear end 302b opposite front end 302a, a first or front raised deck 304 extending axially from front end 302a, a second or rear raised deck 308 extending axially from rear end 302b, and a central drop deck 306 extending axially between raised decks 304, 308. As shown in FIG. 25, gantry 50 is disposed on drop deck such that axes 75 of trusses 72 within upper bridge assembly 70 and axis 115 of trolley bridge assembly 110 are generally oriented parallel to axis 305 of trailer 302.

In this embodiment, foundation 310 is already formed (e.g., poured) when gantry 50 is delivered via trailer 302; however, in other embodiments gantry 50 may be delivered before or during the formation (e.g., pouring) of foundation 310. In addition, in this embodiment, foundation 310 is an elongated rectangle so as to allow the construction of multiple structures (e.g., structures 350) thereon as previously described above. Thus, foundation 310 includes a pair of opposing minor or short sides 311 and a pair of opposing major or long sides 312 (note: only one of the short sides 311 is visible in FIG. 25). In this embodiment, trailer 302 is maneuvered such that axis 305 generally extends along one of the short sides 311 of foundation 310.

Referring now to FIG. 26, after pulling trailer 302 along one of the short sides 311 of foundation 310, gantry 50 is offloaded from trailer 302 directly onto foundation 310 with one or more ramps 303. In particular, gantry 50 is loaded off of trailer 302 and onto foundation 310 in a generally radial direction with respect to axis 305 of trailer 302. Thus, gantry 50 is offloaded from a side of trailer 302. During this process, rollers 67 mounted to lower support frames 62 of vertical support assemblies 60 may engage with ramps 303 or additional wheels may be mounted to lower support frames 62 (e.g., such as wheels 47 shown in FIG. 8) that are to engage with ramps 303 during this process.

Regardless of the method of engaging with ramps 303, in some embodiments, the spacing of vertical support assemblies 60 may be adjusted along upper bridge assembly 70 and trolley bridge assembly 110 in the manner described above such that rollers 67, additional wheels, or other engagement mechanisms coupled to gantry 50 may be aligned with ramps 303 during offloading of gantry 50 onto foundation 310. For example, the spacing between vertical support assemblies 60 of gantry 50 (and thus also the width $W_{50}$) may be adjusted via rolling engagement of rollers 86 with trusses 72 and rolling engagement of rollers 144 and trolley bridge assembly 110 as previously described (see e.g., FIGS. 3, 10, and 17). In addition, in some embodiments gantry 50 may be pulled along ramps 303 from trailer 302 to foundation by a winch or other suitable device (not shown).

In addition, before, during, or after initially offloading gantry 50 from trailer 302 onto foundation 310, rail assemblies 20 (previously described above) may be mounted to and along the long sides 312 of foundation 310. In particular, referring briefly again to FIG. 6 in addition to FIG. 26, rail assemblies 20 may be mounted to long sides 312 by engaging a plurality of bolts 21 through slots 23 in first elongate angle member 22 into foundation 310. Thus, in some embodiments, when gantry 50 is offloaded onto foundation 310, gantry 50 is guided down ramps 303 such that rollers 67 engage with rails 28 formed along rail assemblies 20 (see FIG. 6). Due to the placement of ramps 303, in these embodiments, the additional wheel(s) that may be mounted to lower support frame 62 (e.g., wheel 47 previously described and shown in FIG. 8) may engage with ramps 303 so as to guide rollers 67 on lower frames 64 into engagement with rails 28 on rail assemblies 20.

Referring now to FIGS. 26 and 27, once gantry 50 is disposed onto rails 28 of rail assemblies 20 as previously described, gantry 50 may be utilized to print one or more structures 350 (e.g., dwellings) on foundation 310. In particular, in this embodiment, the structures 350 are arranged side by side on foundation 310 along long sides 312. Because each of the structures 350 are arranged on a single foundation, gantry 50 may print structures 350 in sequential order while generally progressing along long sides 312 of foundation 310. During these printing operations, extrudable building material (e.g., a cement mixture) may be mixed and delivered to gantry 50 on foundation 310. For instance, in some embodiments, dry ingredients 362 of the extrudable building material may be delivered on a separate truck or other suitable conveyance device 360. These dry components may be mixed (e.g., continuously or in batches) in a separate mixing unit (e.g., a mixing truck and/or standalone mixing unit) and then delivered (e.g., pumped) to gantry 50 (specifically printing assembly 150 previously described above). Thus, in at least some embodiments, one or both of the long sides 312 of foundation 310 may be generally aligned with a suitable road way or path to allow delivery of the extrudable building materials to gantry 50 during printing operations of the adjacent structures 350.

During construction operations with construction system 10 (e.g., such as the construction process shown in FIGS. 25-27), extrudable building material (e.g., a cement mixture) is mixed and provided to printing assembly 150 movably disposed on gantry 50 as previously described (see e.g., FIGS. 1 and 23). In some embodiments, the extrudable building material is delivered pre-mixed to the construction site and provided (e.g., pumped) to printing assembly 150. However, in other embodiments, the extrudable building material is mixed at the construction site and provided to printing assembly 150 either continuously or in batches to facilitate the construction of one or more structures (e.g., structures 350 shown in FIG. 27). For example, referring now to FIGS. 28 and 29, construction system 10 (see e.g., FIGS. 1-3, 23) may include a material delivery system 400 for mixing and delivering extrudable building material to printing assembly 150 during operations. In this embodiment, material delivery system 400 is configured to mix and deliver an extrudable building material that comprises a cement mixture; however, it should be appreciated that other embodiments of material delivery system 400 may be configured to mix and/or deliver other types of extrudable building materials (e.g., other than cement mixtures).

In this embodiment, material delivery system 400 is disposed upon a trailer 402 that includes a longitudinal axis 405, a first or front end 402a, a second or rear end 402b opposite front end 402a, and a deck 408 extending axially between ends 402a, 402b. In addition, trailer 402 includes a hitch 404 at front end 402a and a plurality of wheels 406 disposed under deck 408. During operations, trailer 402 may be attached to a vehicle (either directly or indirectly through a second trailer) and towed to a construction site (e.g., such the construction site shown in FIGS. 25-27).

Figure 28:
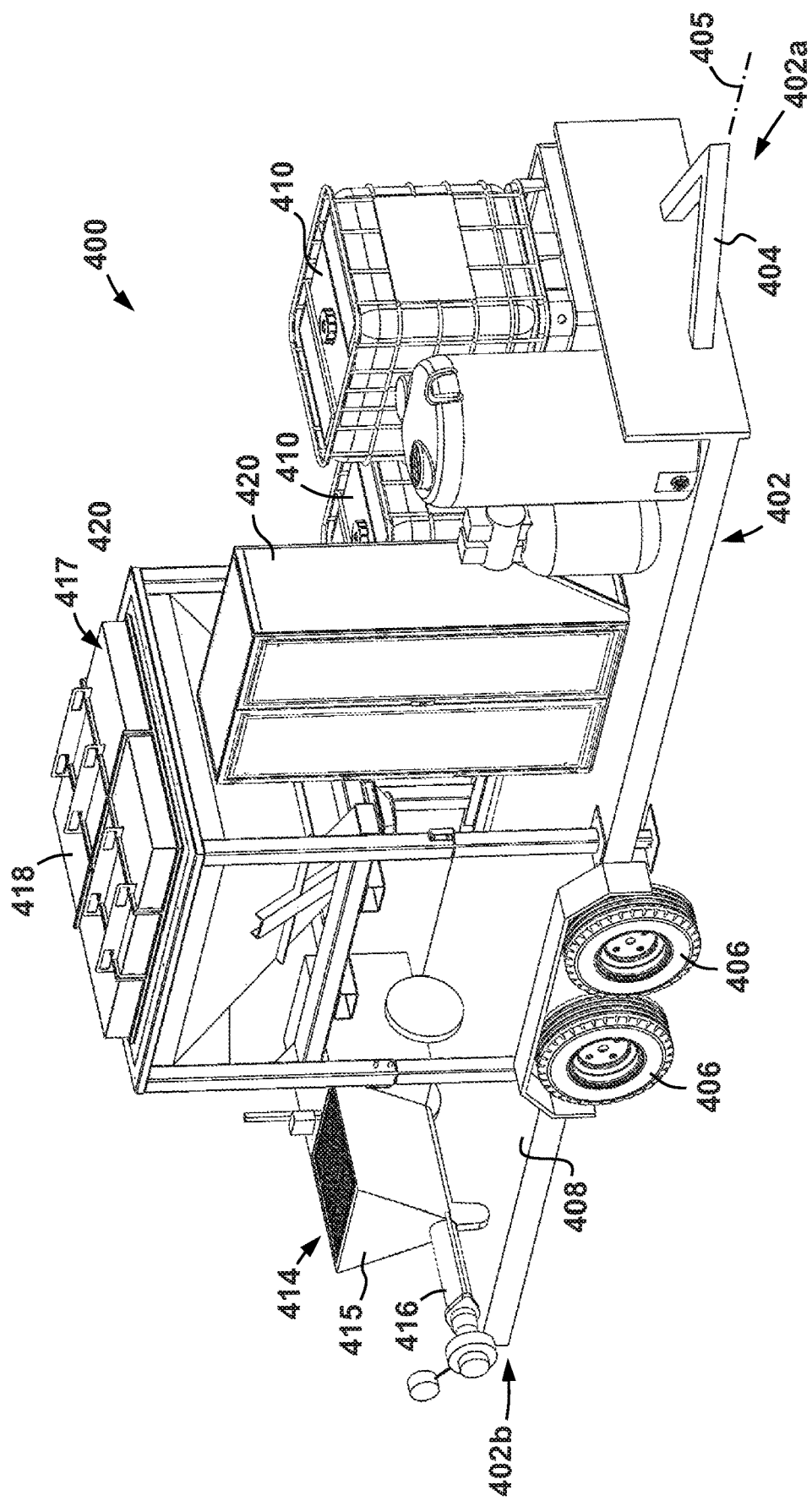
FIGS. 28 and 29 are perspective views of a material delivery system for use with a construction system according to some embodiments disclosed herein.
Figure 29:
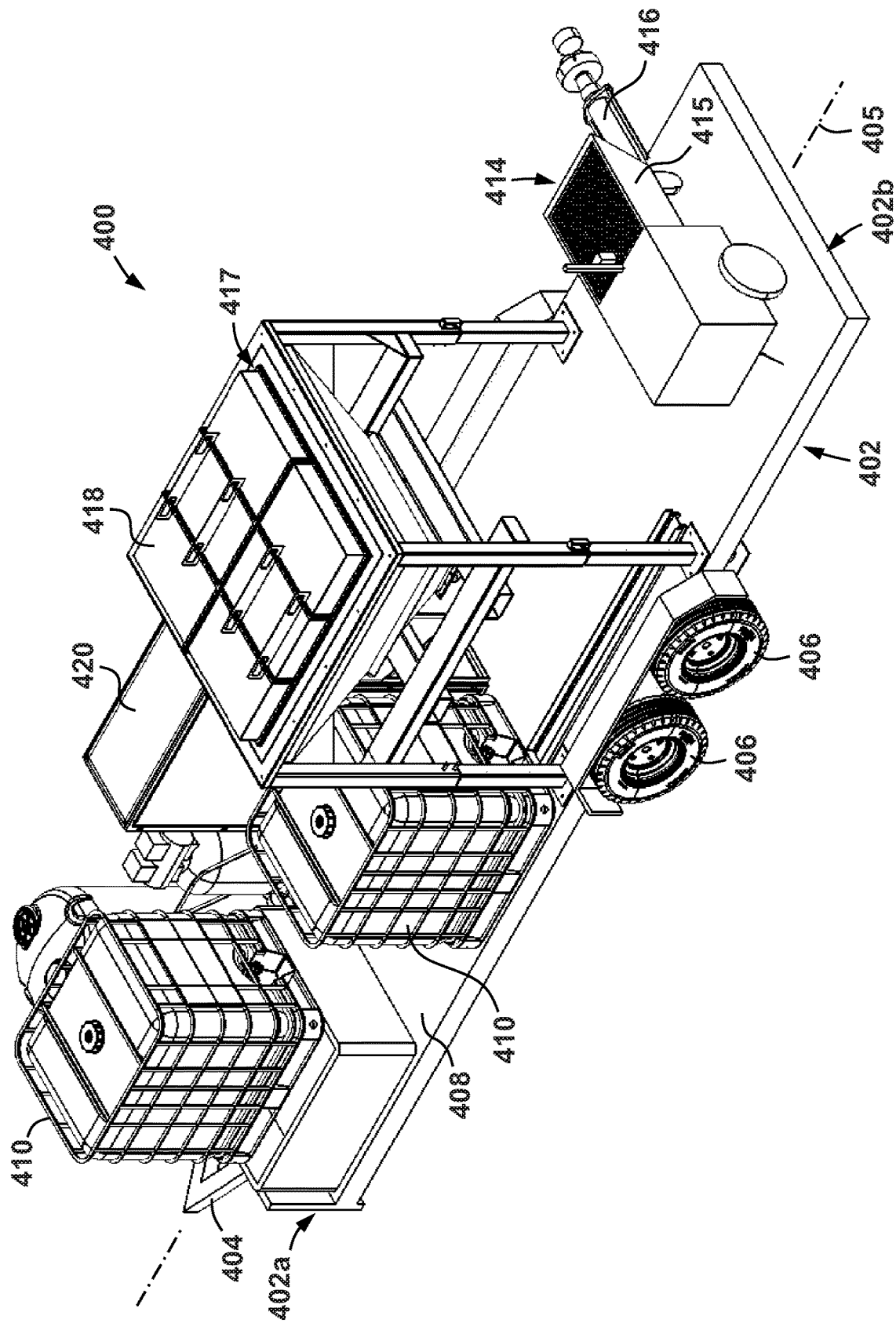

Referring still to FIGS. 28 and 29, material delivery system 400 includes a number of components disposed on deck 408 of trailer 402 for mixing and delivering the extrudable building material to printing assembly 150 (see FIG. 3) during operations. Specifically, in this embodiment, material delivery system includes one or more water tanks 410, a dry ingredient hopper 412, and a mixing unit 414 including an outlet 416 for emitting the mixed building material. In addition, material delivery system 400 also includes a storage cabinet 420 for enclosing various components (e.g., such as electronic components as described in more detail below). While not specifically shown in FIGS. 28 and 29, each of the tanks 410, hopper 412, and mixing unit 414 are in communication with one another (in a manner to be described in more detail below) so as to mix batches the extrudable building material, which are then provided to printing assembly 150 of construction system 10 (see FIGS. 1 and 23) via outlet 416.

Figure 30:
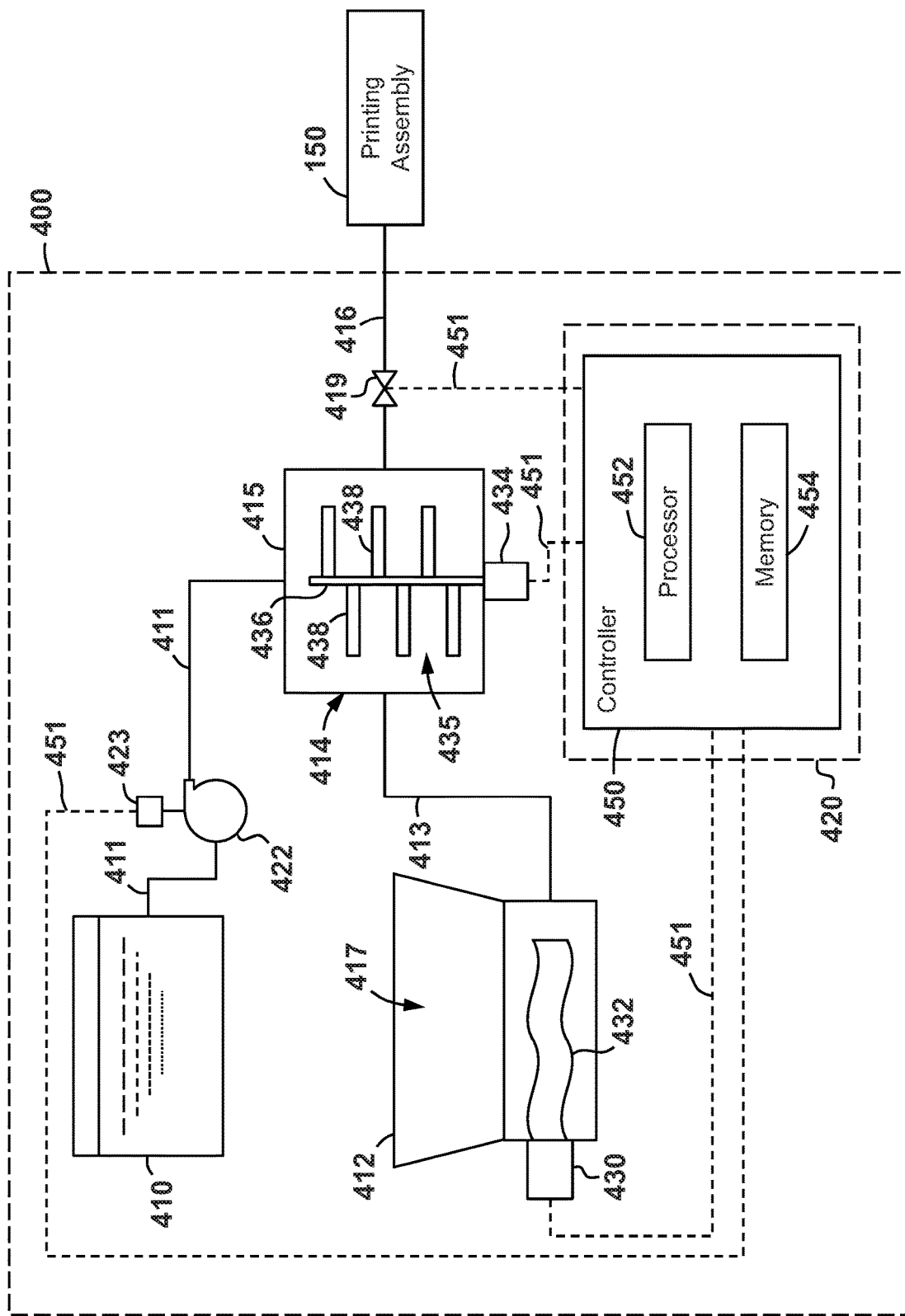
FIG. 30 is a block diagram of the material delivery system of FIGS. 28 and 29.

Referring now to FIG. 30, a schematic diagram of material delivery system 400 is shown. Tank(s) 410 are coupled to mixing unit 414 via a first line 411. A pump 422 is disposed along first line 411 and is configured to be driven by a motor or driver 423 to pressurize and deliver fluid (e.g., water) from tank(s) 410 to mixing unit 414 during operations. Pump 422 may be any suitable design or type, such as, for example a centrifugal pump, a positive displacement pump, a screw pump, etc. In addition, driver 423 may be any suitable driver or motor configured to drive pump 422 during operations, such as, for example, an electric motor, a hydraulic motor, an internal combustion style motor, etc. In this embodiment, driver 423 is an electric motor.

Hopper 412 comprises an upper funnel 417 is configured to receive batches of dry ingredients of extrudable building material during operations. In particular, referring briefly again to FIGS. 28 and 29, funnel 417 may normally be closed within an upper lid 418. However, when it is desired to provide additional dry ingredients (e.g., which may comprise the dry ingredients and/or powders, gravel of a cement mixture) lid 418 is removed and a volume of these dry ingredients are inserted within funnel 417. For instance, in some embodiments, a crane, forklift, or other suitable device may be used to lift a bag (e.g., a bailer bag) of these dry ingredients over funnel 417 such that they may then be deposited therein.

Referring again to FIG. 30, hopper 412 also includes a mixing device 432, which in this embodiment comprises an auger, disposed below funnel 417 that is rotated by a driver 430 to mix and deliver the dry ingredients from hopper 412 to mixing unit 414 via a line 413. As described above for driver 422, driver 430 may comprise any suitable driver or motor (e.g., such as those listed above for driver 422). In this embodiment, driver 430 comprises an electric motor. Lines 411, 413 extending between tank(s) 410, hopper 412, and mixing unit 414 may comprise any suitable conduit or other conveyance member for delivering or channeling liquid or solid materials between two points or locations. For instance, in some embodiments, line 411 may comprise a hose, pipe, channel, and line 413 may comprise a belt, tube, duct, etc.

Mixing unit 414 includes a tank or volume 415 that receives water from tank(s) 410 via line 411 and dry ingredients from hopper 412 via line 413. In addition, mixing unit includes an agitator 435 disposed within volume 415 that is configured to mix the liquid and dry ingredients provided from tank(s) 410 and hopper 412 during operations. In this embodiment, agitator 435 comprises shaft 436 and a plurality of paddles 438 or other suitable mixing devices mounted to and extending outward from shaft 436. Shaft 436 is operatively coupled to a driver 434 that is configured to rotate shaft 436 and paddles 438 within volume 415 during operations to thereby mix the liquids and dry ingredients provided from lines 411 and 413, respectively, during operations. As with drivers 422, 430, driver 434 may comprise any suitable driver or motor (e.g., such as those listed above for driver 422). In this embodiment, driver 434 comprises an electric motor. A valve 419 is disposed along outlet 416 from mixing unit 414. As will be described in more detail below, valve 419 is actuated to selectively deliver mixed, extrudable building material from volume 415 to supply tank 130 (see FIG. 23) for subsequent use within printing assembly 150 as previously described above.

Referring still to FIG. 30, material delivery system 400 also includes a controller 450 that is generally configured to control drivers 423, 430, 434 and valve 419 of material delivery system 400. In this embodiment controller 450 is disposed within cabinet 420; however, in other embodiments, controller 450 may be disposed in any suitable location, including locations that are not located on trailer 402 (see FIGS. 28 and 29). Controller 450 may be a standalone controller that is to control various components of material deliver system 400 as mentioned above, or may be integrated within a broader controller unit or controller for construction system 10 (e.g., such as controller 202 previously described above). In this embodiment, controller 400 is a dedicated control unit for material delivery system 400, and may comprise any suitable device or assembly which is capable of receiving an electrical or informational signal and transmitting various electrical, mechanical, or informational signals to other devices (e.g., drivers 423, 430, 434, valve 419, etc.). In particular, in this example, controller 450 includes a processor 452 and a memory 454. The processor 452 (e.g., microprocessor, central processing unit, or collection of such processor devices, etc.) executes machine readable instructions provided on memory 454 to provide the processor 452 with all of the functionality described herein. The memory 454 may comprise volatile storage (e.g., random access memory), non-volatile storage (e.g., flash storage, read only memory, etc.), or combinations of both volatile and non-volatile storage. Data consumed or produced by the machine readable instructions can also be stored on memory 454. A suitable power source may also be included within or coupled to controller 450 to provide electrical power to the components within controller 450 (e.g., processor 452, memory 454, etc.). The power source may comprise any suitable source of electrical power such as, for example, a battery, capacitor, a converter or a local power grid, etc.

Controller 450 may be coupled to each of the drivers 423, 430, 434 and valve 419 via a plurality of communication paths 451. Communication paths 451 may comprise any suitable wired (e.g., conductive wires, fiber optic cables, etc.) or wireless connection (e.g., WIFI, BLUETOOTH®, near field communication, radio frequency communication, infrared communication, etc.). In this embodiment, communications paths 451 comprise conductive wires that are configured to transmit power and/or communication signals during operations.

During operations controller 450 is configured to selectively actuate drivers 423, 430, 434 so as to selectively actuate pump 422, auger 432, shaft 436, respectively. In addition, controller 450 is configured to selectively actuate valve 419 between a fully closed position (whereby no building materials are allowed to flow through outlet 416), a fully open position (whereby building materials are allowed to freely flow through outlet 416), and a plurality of positions between the fully closed position and the fully open position. Valve 419 may be actuated by any suitable method or device (e.g., electrically, hydraulically, magnetically, etc.). In this example, controller 450 is configured to electrically actuate valve 419 as described above via the corresponding communication path 451.

Further, controller 450 is configured to measure or detect a torque imparted to shaft 436 due to the resistance or viscosity of the building materials within volume 415 of mixing unit 414. For instance, controller 450 may measure or detect the torque imparted to shaft 436 with a suitable sensor or measurement device within driver 434 or mounted to shaft 436 itself. In other examples, controller 450 may determine the torque imparted to shaft 436 by analyzing the electrical load drawn by driver 434 when rotating shaft 436 during operations.

Generally speaking during mixing operations, controller 450 actuates pump 422 and auger 432 via drivers 423 and 430, respectively, to deliver water from tank 410 and dry ingredients from hopper 412 into volume 415 of mixing unit 414. In addition, controller 450 actuates driver 434 to rotate shaft 436 and paddles 438 within volume 415 to mix the water and dry ingredients together. During this process, controller 450 may measure the torque load imparted to shaft 436 by the materials disposed within volume 415. If the torque load is above a first threshold, then controller 450 may determine (e.g., via execution of machine readable instructions with processor 452) that the viscosity of the mixture in volume 115 is too high and that additional water should be added. As a result, controller 450 may actuate pump 422 to provide additional water from tank(s) 410 to volume 415 via line 411. If, on the other hand, if the torque load imparted to shaft 436 is below a second threshold (that is lower than the first threshold) then controller 450 may determine that the viscosity of the mixture in volume 115 is too low and that additional dry ingredients should be added. As a result, controller 450 may actuate auger 432 to provide additional dry ingredients to volume 415 via line 413. If the torque load imparted to shaft 436 is between or equal to the first threshold and the second threshold, controller 450 may determine that the batch mixture within volume 415 of mixing unit 414 has the appropriate proportions of water and dry ingredients and then may actuate valve 419 to the open position (when desired) to deliver the mixed, extrudable building material to printing assembly 150 (or supply tank 130 that is to supply the building material to printing assembly 150 as previously described—see e.g., FIG. 23). Thus, controller 450 and mixing unit 414 may form a rheometer for ensuring that the extrudable building material delivered to printing assembly 150 includes a consistent mixture, and thereby exhibits a consistent performance during a construction operation.

Figure 31:
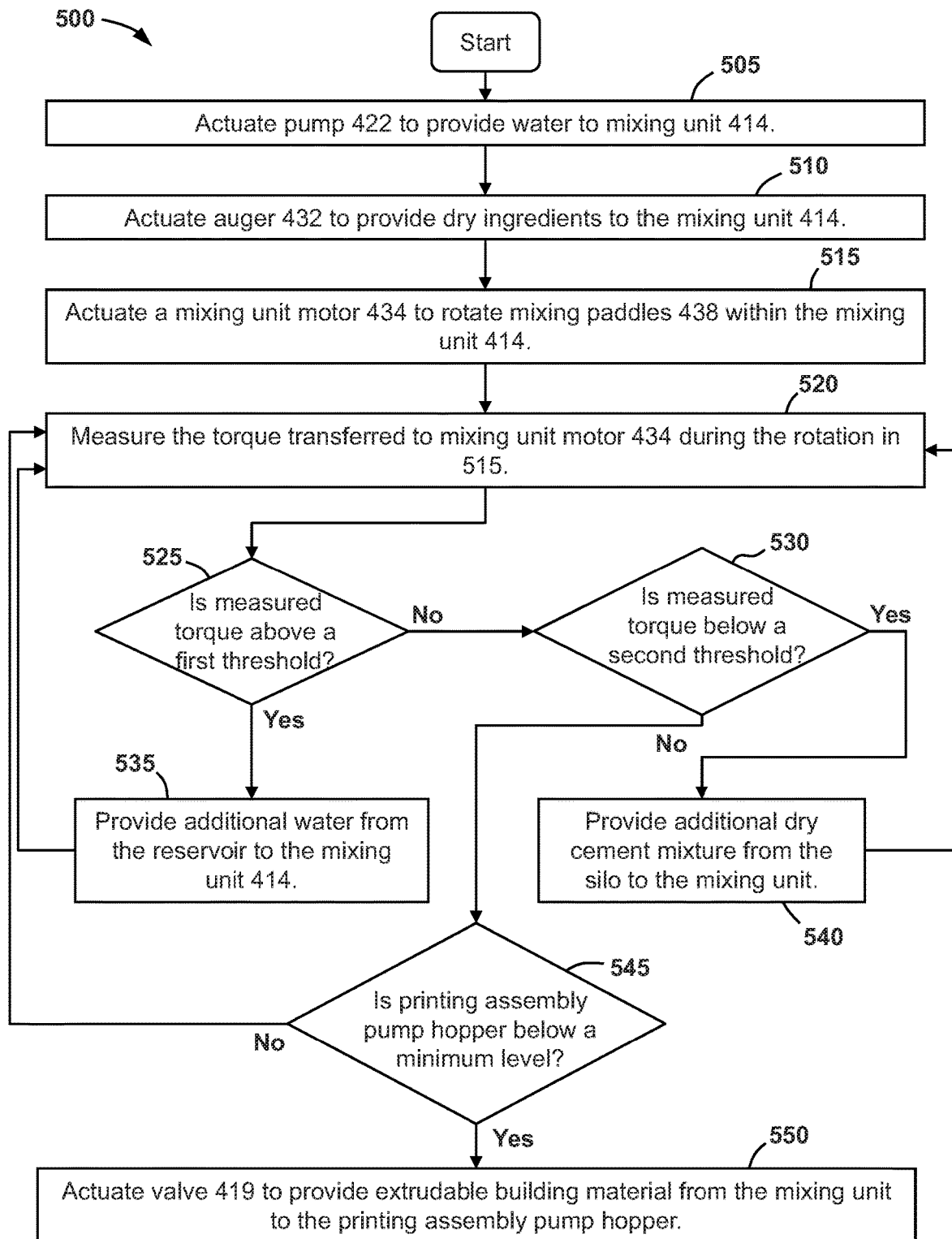
FIG. 31 is a flow chart of a method for mixing and delivering an extrudable building material with the material delivery system of FIGS. 28 and 29.

Referring now to FIG. 31, a method 500 for mixing and delivering an extrudable building material to a printing assembly (e.g., printing assembly 150) with material delivery system 400 is shown. Method 500 may be practiced wholly or partially by controller 450 (e.g., by processor 452 executing machine readable instructions stored on memory 454) within material deliver system 400. As a result, continuing reference is made to material delivery system 400 in describing the features of method 500. However, it should be appreciated that other assemblies, systems, and/or personnel may be used to carry out method 500 in other embodiments. Thus, in describing method 500, references to the actions or functions of controller 450 or the features of material delivery system 400 are meant to explain or describe particular embodiments of method 500 and should not be interpreted as limiting all possible embodiments of method 500.

Initially, method 500 begins by actuating pump 422 to provide water to mixing unit 414 at 505 and actuating auger 432 to provide dry ingredients to the mixing unit at 510. Next, method 500 includes actuating the mixing unit motor 434 to rotate mixing paddles 438 at 515. In particular, at 515, the paddles 438 are rotated within the volume 415 of mixing unit 414 to mix and combine the water and dry ingredients provided to mixing unit 414 at 505 and 510, respectively. Next, method 500 includes measuring the torque imparted to the mixing unit motor 434 at 520 during the rotating of the paddles 438 at 515. In particular, as previously described above, the torque imparted to the mixing unit motor 434 may be measured by, for example, analyzing the electrical current drawn by the mixing unit motor 434 during the rotation of the paddles 438 and/or by receiving an output signal from one or more sensors or other measurement devices coupled to paddles 438, motor 434, or other suitable components.

Referring still to FIG. 31, once the torque imparted on the mixing unit motor 434 is measured at 520, method 500 enquires as to whether the measured torque is above a first threshold at 525. If the measured torque from 520 is above the first threshold in 525 (i.e., the determination at 525 is "Yes"), then method 500 proceeds to 545 whereby additional water is provided to mixing unit 414 (e.g., via pump 422 as previously described). The amount of the additional water provided to the mixing unit 414 may be a predetermined, incremental amount or volume, or it may be determined (e.g., by controller 450) based on the measured torque at 520 (e.g., such as a difference between the measured torque and the first threshold in 525). After the additional water is supplied to the mixing unit 434 at 535, method 500 returns to 520 to once again measure the torque imparted to the mixing unit motor 434.

If, on the other hand, the determination at 525 is that the measured torque at 520 is not above the first threshold value (i.e., the determination at 525 is "No"), then method 500 proceeds to enquire as to whether the measured torque from 520 is below a second threshold at 530. The second threshold 530 may be below the first threshold in 525. If the measured torque from 520 is below the second threshold in 530 (i.e., the determination at 530 is "Yes"), then method 500 proceeds to 540 whereby additional dry ingredients are provided to mixing unit 414 (e.g., via auger 432 as previously described). The amount of the additional dry ingredients provided to the mixing unit 414 at 540 may be a predetermined, incremental amount or volume, or it may be determined (e.g., by controller 450) based on the measured torque at 520 (e.g., such as a difference between the measured torque and the second threshold in 530). After the additional dry ingredients are supplied to the mixing unit 434 at 540, method 500 returns to 520 to once again measure the torque imparted to the mixing unit motor 434.

If, on the other hand, the determination at 530 is that the measured torque at 520 is not below the second threshold value (i.e., the determination at 530 is "No"), then method 500 proceeds to enquire as to whether the printing assembly building material source tank is below a minimum level at 545. In particular, in some embodiments the printing assembly source tank comprises the supply tank 130 shown in FIG. 23. Thus, in these embodiments, supply tank 130 may include a level sensor (not shown) that communicates either directly with controller 450 or through another control unit (e.g., controller 202 shown in FIG. 23), so that controller 450 is able to determine, at 545, whether the level within supply tank 130 is below some minimum depth so that additional building material should be delivered thereto to support construction operations with printing assembly 150. Therefore, if the determination at 545 is that the level of the printing assembly supply tank 130 is below the minimum level (i.e., the determination at 545 is "Yes"), then method proceeds to 550 to actuate valve 419 to an open position (e.g., the fully open position or a partially open position) to provide the mixed, extrudable building material to supply tank 130. If, on the other hand, it is determined that the level within supply tank 130 is not below the minimum level at 545 (i.e., the determination at 545 is "No"), then method 500 returns to 520 to once again measure the torque imparted to the mixing unit motor 434. Thus, the enquiries 525 and 530 are repeatedly performed until the extrudable building material is delivered to the source at 550 so as to ensure that the extrudable building material includes the desired proportions of ingredients (namely water and dry ingredients).

The first and second threshold values discussed above within blocks 525 and 530, respectively, of method 500 may be determined based on a desired proportion of water to dry ingredients within the extrudable building material. For example, in some embodiments, the extrudable building material may comprise a cement mixture including cement, gravel and other dry ingredients that are mixed with a desired amount of water prior to extrusion by the printing assembly 150. Thus, the first and second threshold values may be set to result in a desired viscosity which is in turn associated with a desired proportion of water to dry ingredients within the cement mixture. In some embodiments, the first and second threshold values may be equal or substantially equal to one another, and in other embodiments, the first and second threshold values may be different (e.g., with the second threshold value being smaller or lower than the first threshold value as previously described).

In the manner described, systems and methods for designing and constructing a structure via 3D printing have been described. In some embodiments, the above described methods and systems may be utilized with any one of the constructions systems previously described herein to construct a structure. Accordingly, by use of the systems and methods disclosed herein, the time and materials required to construct a structure may be reduced.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A construction system for constructing a structure on a foundation, the construction system comprising:
   a rail assembly configured to be mounted to the foundation;
   a gantry movably disposed on the rail assembly configured to translate along a first axis relative to the rail assembly; and
   a printing assembly movably disposed on the gantry and configured to translate along a second axis relative to the gantry, wherein the second axis is orthogonal to the first axis;
   wherein the printing assembly is configured to deposit vertically stacked layers of an extrudable building material on the foundation to construct the structure;

a lateral adjustment assembly comprising a truss and a plurality of rollers; and wherein the gantry has a width along the second axis that is configured to be adjusted relative to the foundation via rolling engagement of the plurality of rollers of the lateral adjustment assembly with the truss.

2. The construction system of claim 1, wherein the rail assembly comprises a first rail assembly and a second rail assembly configured to be mounted to opposing sides of the foundation;

wherein the gantry comprises a first vertical support assembly and a second vertical support assembly, wherein the first vertical support assembly is movably coupled to the first rail assembly and the second vertical support assembly is movably coupled to the second rail assembly; and wherein the width of the gantry extends between the first and second vertical support assemblies along the second axis.

3. The construction system of claim 2, further comprising:

the truss extending axially between the first and second vertical support assemblies with respect to the second axis; and the lateral adjustment assembly coupled between the truss and the first vertical support assembly, wherein the lateral adjustment assembly comprises the plurality of rollers engaged with the truss, and wherein rolling engagement of the plurality of rollers with the truss is configured to adjust the width of the gantry along the second axis.

4. The construction system of claim 3, wherein the lateral adjustment assembly further comprises a locking assembly comprising:

a handle;

an engagement member; and a frame coupled between the handle and the engagement member;

wherein manipulation of the handle is configured to move the engagement member into engagement with the truss.

5. The construction system of claim 3, further comprising:

a trolley bridge assembly movably coupled to the first and second vertical support assemblies such that the trolley bridge assembly is configured to translate along a third axis relative to the first and second vertical support assemblies;

wherein the third axis is orthogonal to each of the first axis and the second axis; and wherein the printing assembly is movably coupled to the trolley bridge assembly.

6. The construction system of claim 5, wherein the trolley bridge assembly is coupled to the first vertical support assembly with a vertical adjustment assembly that comprises a plurality of rollers engaged with the trolley bridge assembly, and wherein rolling engagement of the plurality of rollers of the vertical adjustment assembly with the trolley bridge assembly is configured to adjust the width of the gantry along the second axis.

7. The construction system of claim 6, wherein the vertical adjustment assembly comprises a collar;

wherein the first vertical support assembly comprises:

a guide rod that is slidably received within the collar; and a chain mounted to the vertical adjustment assembly;

wherein actuation of the chain is configured to translate the vertical adjustment assembly and the trolley bridge assembly along the third axis relative to the first vertical support assembly.

8. The construction system of claim 1, further comprising:

a first driver coupled to the gantry that is configured to drive translation of the gantry along the first axis;

a second driver coupled to the printing assembly, wherein the second driver is configured to drive translation of the printing assembly along the second axis; and a controller coupled to the first driver and the second driver and configured to actuate the first and second drivers to selectively maneuver the printing assembly about the foundation.

9. The construction system of claim 8, wherein the printing assembly comprises a valve and an outflow nozzle downstream of the valve, wherein the controller is coupled to the valve and is configured to actuate the valve between a closed position and an open position.

10. The construction system of claim 9, further comprising:

a supply tank configured to retain the extrudable building material therein;

a pump coupled to the tank; and a supply conduit in fluid communication with the pump and the valve of the printing assembly;

wherein the pump is coupled to the controller; and wherein the controller is configured to actuate the pump to induce a flow of fluid from the tank toward the valve.

* * * * *